United States Patent
Scholl et al.

(10) Patent No.: US 12,169,862 B2
(45) Date of Patent: Dec. 17, 2024

(54) ONLINE ORDERING FOR IN-SHOP SERVICE

(71) Applicant: Bytedance Inc., Wilmington, DE (US)

(72) Inventors: Nathaniel B. Scholl, Oakland, CA (US); Jason Crawford, San Francisco, CA (US); Joshua Puckett, Palo Alto, CA (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

(21) Appl. No.: 18/171,041

(22) Filed: Feb. 17, 2023

(65) Prior Publication Data

US 2023/0325906 A1 Oct. 12, 2023

Related U.S. Application Data

(63) Continuation of application No. 16/891,743, filed on Jun. 3, 2020, now Pat. No. 11,615,459, which is a
(Continued)

(51) Int. Cl.
*G06Q 30/0601* (2023.01)
*G06Q 20/14* (2012.01)
(Continued)

(52) U.S. Cl.
CPC ....... *G06Q 30/0635* (2013.01); *G06Q 20/145* (2013.01); *G06Q 30/02* (2013.01); *G06Q 30/06* (2013.01); *G06Q 50/12* (2013.01)

(58) Field of Classification Search
CPC .. G06Q 30/0635; G06Q 20/145; G06Q 30/02; G06Q 30/06; G06Q 50/12
See application file for complete search history.

(56) References Cited

U.S. PATENT DOCUMENTS 5,715,445 A 2/1998 Wolfe
5,870,770 A 2/1999 Wolfe
(Continued)

FOREIGN PATENT DOCUMENTS

KR 10-2008-0036829 A 4/2008
WO 00/79456 A2 12/2000
(Continued)

OTHER PUBLICATIONS

US 6,047,266 A, 04/2000, Van Horn et al. (withdrawn)
(Continued)

*Primary Examiner* — Paul Danneman
(74) *Attorney, Agent, or Firm* — Alston & Bird LLP

(57) ABSTRACT

Systems and related methods providing for online ordering of menu items from a merchant are discussed herein. Circuitry may be configured to generate an online menu based on menu information stored in a menu database. The menu information may be also configured to facilitate point-of-sale functionality at the merchant, such as by a point-of-sale device. The online menu may be provided to a consumer device. An online order may be received from the consumer device. The circuitry may be configured to process the online order, such as by facilitating a reservation, order preparation, and payment.

20 Claims, 23 Drawing Sheets

Related U.S. Application Data continuation of application No. 16/176,793, filed on Oct. 31, 2018, now Pat. No. 10,713,707, which is a continuation of application No. 13/839,414, filed on Mar. 15, 2013, now Pat. No. 10,147,130.

(60) Provisional application No. 61/706,664, filed on Sep. 27, 2012.

(51) Int. Cl.
*G06Q 30/02* (2023.01)
*G06Q 30/06* (2023.01)
*G06Q 50/12* (2012.01)

(56) References Cited

U.S. PATENT DOCUMENTS

| | | | |
|---|---|---|---|
| 5,946,682 | A | 8/1999 | Wolfe |
| 5,948,040 | A | 9/1999 | Delorme et al. |
| 5,970,470 | A | 10/1999 | Walker et al. |
| 6,006,252 | A | 12/1999 | Wolfe |
| 6,049,778 | A | 4/2000 | Walker et al. |
| 6,101,484 | A | 8/2000 | Halbert et al. |
| 6,128,599 | A | 10/2000 | Walker et al. |
| 6,151,603 | A | 11/2000 | Wolfe |
| 6,154,172 | A | 11/2000 | Piccionelli et al. |
| 6,249,772 | B1 | 6/2001 | Walker et al. |
| 6,263,351 | B1 | 7/2001 | Wolfe |
| 6,269,343 | B1 | 7/2001 | Pallakoff |
| 6,292,813 | B1 | 9/2001 | Wolfe |
| 6,301,576 | B1 | 10/2001 | Wolfe |
| 6,327,573 | B1 | 12/2001 | Walker et al. |
| 6,336,131 | B1 | 1/2002 | Wolfe |
| 6,341,305 | B2 | 1/2002 | Wolfe |
| 6,384,850 | B1 | 5/2002 | McNally et al. |
| 6,415,262 | B1 | 7/2002 | Walker et al. |
| 6,463,265 | B1 | 10/2002 | Cohen et al. |
| 6,477,581 | B1 | 11/2002 | Carpenter et al. |
| 6,584,451 | B1 | 6/2003 | Shoham et al. |
| 6,604,089 | B1 | 8/2003 | Van et al. |
| 6,604,103 | B1 | 8/2003 | Wolfe |
| 6,631,356 | B1 | 10/2003 | Van et al. |
| 6,754,636 | B1 | 6/2004 | Walker et al. |
| 6,778,837 | B2 | 8/2004 | Bade et al. |
| 6,812,851 | B1 | 11/2004 | Dukach et al. |
| 6,836,476 | B1 | 12/2004 | Dunn et al. |
| 6,842,719 | B1 | 1/2005 | Fitzpatrick et al. |
| 6,876,983 | B1 | 4/2005 | Goddard et al. |
| 6,901,374 | B1 | 5/2005 | Himes |
| 6,918,039 | B1 | 7/2005 | Hind et al. |
| 6,928,416 | B1 | 8/2005 | Bertash |
| 6,931,130 | B1 | 8/2005 | Kraft et al. |
| 6,934,690 | B1 | 8/2005 | Van et al. |
| 6,937,868 | B2 | 8/2005 | Himmel et al. |
| 6,970,837 | B1 | 11/2005 | Walker et al. |
| 6,970,922 | B1 | 11/2005 | Spector |
| 6,985,879 | B2 | 1/2006 | Walker et al. |
| 7,000,116 | B2 | 2/2006 | Bates et al. |
| 7,007,013 | B2 | 2/2006 | Davis et al. |
| 7,039,603 | B2 | 5/2006 | Walker et al. |
| 7,043,526 | B1 | 5/2006 | Wolfe |
| 7,072,848 | B2 | 7/2006 | Boyd et al. |
| 7,080,029 | B1 | 7/2006 | Fallside et al. |
| 7,103,365 | B2 | 9/2006 | Myllymaki |
| 7,103,565 | B1 | 9/2006 | Vaid |
| 7,103,594 | B1 | 9/2006 | Wolfe |
| 7,107,228 | B1 | 9/2006 | Walker et al. |
| 7,107,230 | B1 | 9/2006 | Halbert et al. |
| 7,113,797 | B2 | 9/2006 | Kelley et al. |
| 7,124,099 | B2 | 10/2006 | Mesaros |
| 7,124,107 | B1 | 10/2006 | Pishevar et al. |
| 7,124,186 | B2 | 10/2006 | Piccionelli |
| 7,146,330 | B1 | 12/2006 | Alon et al. |
| 7,181,419 | B1 | 2/2007 | Mesaros |
| 7,194,427 | B1 | 3/2007 | Van et al. |
| 7,236,944 | B1 | 6/2007 | Schwartz et al. |
| 7,246,310 | B1 | 7/2007 | Wolfe |
| 7,251,617 | B1 | 7/2007 | Walker et al. |
| 7,257,604 | B1 | 8/2007 | Wolfe |
| 7,263,498 | B1 | 8/2007 | Van et al. |
| 7,274,941 | B2 | 9/2007 | Cole et al. |
| 7,289,815 | B2 | 10/2007 | Gfeller et al. |
| 7,302,638 | B1 | 11/2007 | Wolfe |
| 7,318,041 | B2 | 1/2008 | Walker et al. |
| 7,340,691 | B2 | 3/2008 | Bassett et al. |
| 7,349,879 | B2 | 3/2008 | Alsberg et al. |
| 7,363,246 | B1 | 4/2008 | Van et al. |
| 7,376,580 | B1 | 5/2008 | Walker et al. |
| 7,406,322 | B2 | 7/2008 | McMahan et al. |
| 7,406,332 | B1 | 7/2008 | Gaillard et al. |
| 7,409,429 | B2 | 8/2008 | Kaufman et al. |
| 7,428,418 | B2 | 9/2008 | Cole et al. |
| 7,430,520 | B1 | 9/2008 | Haugen et al. |
| 7,430,521 | B2 | 9/2008 | Walker et al. |
| 7,433,874 | B1 | 10/2008 | Wolfe |
| 7,447,642 | B2 | 11/2008 | Bodin |
| 7,467,137 | B1 | 12/2008 | Wolfe |
| 7,469,138 | B2 | 12/2008 | Dayar et al. |
| 7,472,109 | B2 | 12/2008 | Katibah et al. |
| 7,480,627 | B1 | 1/2009 | Van et al. |
| 7,529,542 | B1 | 5/2009 | Chevion et al. |
| 7,536,385 | B1 | 5/2009 | Wolfe |
| 7,539,742 | B2 | 5/2009 | Spector |
| 7,577,581 | B1 | 8/2009 | Schuyler |
| 7,589,628 | B1 | 9/2009 | Brady, Jr. |
| 7,613,631 | B2 | 11/2009 | Walker et al. |
| 7,627,498 | B1 | 12/2009 | Walker et al. |
| 7,643,836 | B2 | 1/2010 | McMahan et al. |
| 7,650,307 | B2 | 1/2010 | Stuart |
| 7,668,832 | B2 | 2/2010 | Yeh et al. |
| 7,672,897 | B2 | 3/2010 | Chung et al. |
| 7,689,468 | B2 | 3/2010 | Walker et al. |
| 7,689,469 | B1 | 3/2010 | Mesaros |
| 7,693,736 | B1 | 4/2010 | Chu et al. |
| 7,693,748 | B1 | 4/2010 | Mesaros |
| 7,693,752 | B2 | 4/2010 | Jaramillo |
| 7,702,560 | B1 | 4/2010 | Wiesehuegel et al. |
| 7,711,604 | B1 | 5/2010 | Walker et al. |
| 7,720,743 | B1 | 5/2010 | Marks |
| 7,725,480 | B2 | 5/2010 | Bassett et al. |
| 7,734,779 | B1 | 6/2010 | Piccionelli |
| 7,760,112 | B2 | 7/2010 | Bauchot et al. |
| 7,774,453 | B2 | 8/2010 | Babu et al. |
| 7,783,279 | B2 | 8/2010 | Ramanathan et al. |
| 7,788,281 | B2 | 8/2010 | Cole et al. |
| 7,791,487 | B2 | 9/2010 | Meyer |
| 7,792,297 | B1 | 9/2010 | Piccionelli et al. |
| 7,797,170 | B2 | 9/2010 | Bodin |
| 7,848,765 | B2 | 12/2010 | Phillips et al. |
| 7,860,753 | B2 | 12/2010 | Walker et al. |
| 7,870,229 | B2 | 1/2011 | Spector |
| 7,890,364 | B2 | 2/2011 | Piccionelli |
| 8,010,417 | B2 | 8/2011 | Walker et al. |
| 8,103,519 | B2 | 1/2012 | Kramer et al. |
| 8,108,249 | B2 | 1/2012 | Schroeder et al. |
| 8,121,874 | B1 | 2/2012 | Guheen et al. |
| 8,131,619 | B1 | 3/2012 | Veselka |
| 8,150,725 | B2 | 4/2012 | Subramaniam et al. |
| 8,150,735 | B2 | 4/2012 | Walker et al. |
| 8,175,908 | B1 | 5/2012 | Anderson |
| 8,204,797 | B2 | 6/2012 | Wanker |
| 8,284,061 | B1 | 10/2012 | Dione |
| 8,301,495 | B2 | 10/2012 | Mason |
| 8,355,948 | B2 | 1/2013 | Mason |
| 8,364,501 | B2 | 1/2013 | Rana et al. |
| 8,407,252 | B2 | 3/2013 | Bennett et al. |
| 8,577,727 | B1 * | 11/2013 | Harrity ............... G06Q 30/00 705/16 |
| 8,590,785 | B1 | 11/2013 | Mesaros |
| 8,650,072 | B2 | 2/2014 | Mason et al. |
| 8,650,079 | B2 | 2/2014 | Fano et al. |
| 8,725,597 | B2 | 5/2014 | Mauseth et al. |
| 9,111,323 | B2 | 8/2015 | Freeman |
| 9,507,494 | B1 | 11/2016 | Kerr et al. |

(56) References Cited

U.S. PATENT DOCUMENTS

| | | |
|---|---|---|
| 9,934,537 B2 | 4/2018 | Berland et al. |
| 10,235,696 B1 | 3/2019 | L'Huillier et al. |
| 2002/0023010 A1 | 2/2002 | Rittmaster et al. |
| 2002/0065713 A1 | 5/2002 | Awada et al. |
| 2002/0103746 A1 | 8/2002 | Moffett |
| 2002/0116260 A1 | 8/2002 | Szabo et al. |
| 2002/0123930 A1 | 9/2002 | Boyd et al. |
| 2002/0147663 A1 | 10/2002 | Walker et al. |
| 2002/0178071 A1 | 11/2002 | Walker et al. |
| 2002/0188511 A1 | 12/2002 | Johnson et al. |
| 2003/0004802 A1 | 1/2003 | Callegari |
| 2003/0018559 A1 | 1/2003 | Chung et al. |
| 2003/0033587 A1 | 2/2003 | Ferguson et al. |
| 2003/0055765 A1 | 3/2003 | Bernhardt |
| 2003/0233278 A1 | 12/2003 | Marshall |
| 2004/0039626 A1 | 2/2004 | Voorhees |
| 2004/0116074 A1 | 6/2004 | Fujii et al. |
| 2004/0117246 A1 | 6/2004 | Applebaum |
| 2004/0148228 A1 | 7/2004 | Kwei |
| 2004/0186789 A1 | 9/2004 | Nakashima |
| 2004/0193489 A1 | 9/2004 | Boyd et al. |
| 2004/0243478 A1 | 12/2004 | Walker et al. |
| 2005/0043996 A1 | 2/2005 | Silver |
| 2005/0071223 A1 | 3/2005 | Jain et al. |
| 2005/0075945 A1 | 4/2005 | Hodge et al. |
| 2005/0080675 A1 | 4/2005 | Lovegreen et al. |
| 2005/0102156 A1 | 5/2005 | Linduff |
| 2005/0182680 A1 | 8/2005 | Jones et al. |
| 2005/0221841 A1 | 10/2005 | Piccionelli et al. |
| 2005/0245241 A1 | 11/2005 | Durand et al. |
| 2006/0020512 A1 | 1/2006 | Lucas et al. |
| 2006/0069619 A1 | 3/2006 | Walker et al. |
| 2006/0085259 A1 | 4/2006 | Nicholas et al. |
| 2006/0089882 A1 | 4/2006 | Shimansky |
| 2006/0106678 A1 | 5/2006 | Walker et al. |
| 2006/0161599 A1 | 7/2006 | Rosen |
| 2006/0178932 A1 | 8/2006 | Lang |
| 2006/0195368 A1 | 8/2006 | Walker et al. |
| 2006/0218043 A1 | 9/2006 | Rosenzweig et al. |
| 2006/0224465 A1 | 10/2006 | Walker et al. |
| 2006/0224466 A1 | 10/2006 | Walker et al. |
| 2006/0224467 A1 | 10/2006 | Walker et al. |
| 2006/0235754 A1 | 10/2006 | Walker et al. |
| 2006/0242028 A1 | 10/2006 | Walker et al. |
| 2006/0242036 A1 | 10/2006 | Walker et al. |
| 2006/0265289 A1 | 11/2006 | Bellissimo |
| 2007/0061209 A1 | 3/2007 | Jackson |
| 2007/0061220 A1 | 3/2007 | Vaid |
| 2007/0150354 A1 | 6/2007 | Walker et al. |
| 2007/0150371 A1 | 6/2007 | Gangji |
| 2007/0156529 A1 | 7/2007 | Walker et al. |
| 2007/0198360 A1 | 8/2007 | Rogers et al. |
| 2007/0208625 A1 | 9/2007 | Walker et al. |
| 2007/0225077 A1 | 9/2007 | Piccionelli |
| 2007/0280269 A1 | 12/2007 | Rosenberg |
| 2007/0281692 A1 | 12/2007 | Bucher et al. |
| 2007/0288309 A1 | 12/2007 | Haberman et al. |
| 2007/0288330 A1 | 12/2007 | Vaid |
| 2008/0004888 A1 | 1/2008 | Davis et al. |
| 2008/0015938 A1 | 1/2008 | Haddad et al. |
| 2008/0027810 A1 | 1/2008 | Lerner et al. |
| 2008/0040175 A1 | 2/2008 | Dellovo |
| 2008/0040211 A1 | 2/2008 | Walker et al. |
| 2008/0052186 A1 | 2/2008 | Walker et al. |
| 2008/0052189 A1 | 2/2008 | Walker et al. |
| 2008/0065490 A1 | 3/2008 | Novick et al. |
| 2008/0065565 A1 | 3/2008 | Walker et al. |
| 2008/0071622 A1 | 3/2008 | Walker et al. |
| 2008/0097857 A1 | 4/2008 | Walker et al. |
| 2008/0133336 A1 | 6/2008 | Altman et al. |
| 2008/0154714 A1 | 6/2008 | Liu et al. |
| 2008/0162318 A1 | 7/2008 | Butler et al. |
| 2008/0167991 A1 | 7/2008 | Carlson et al. |
| 2008/0201232 A1 | 8/2008 | Walker et al. |
| 2008/0208663 A1 | 8/2008 | Walker et al. |
| 2008/0208744 A1 | 8/2008 | Arthur et al. |
| 2008/0242514 A1 | 10/2008 | Piccionelli et al. |
| 2008/0255973 A1 | 10/2008 | El et al. |
| 2008/0270209 A1 | 10/2008 | Mauseth et al. |
| 2009/0006182 A1 | 1/2009 | Gammon |
| 2009/0024450 A1 | 1/2009 | Chen et al. |
| 2009/0024484 A1 | 1/2009 | Walker et al. |
| 2009/0027286 A1 | 1/2009 | Ohishi et al. |
| 2009/0030776 A1 | 1/2009 | Walker et al. |
| 2009/0037286 A1* | 2/2009 | Foster .................. G06Q 20/20 705/16 |
| 2009/0070263 A1 | 3/2009 | Davis et al. |
| 2009/0094109 A1 | 4/2009 | Aaronson et al. |
| 2009/0125414 A1 | 5/2009 | Kleinrock et al. |
| 2009/0150218 A1 | 6/2009 | Brunner et al. |
| 2009/0167553 A1 | 7/2009 | Hong et al. |
| 2009/0192935 A1 | 7/2009 | Griffin et al. |
| 2009/0234710 A1 | 9/2009 | Belgaied et al. |
| 2009/0271270 A1 | 10/2009 | Regmi et al. |
| 2009/0271275 A1 | 10/2009 | Regmi et al. |
| 2009/0307067 A1 | 12/2009 | Obermeyer |
| 2009/0313109 A1 | 12/2009 | Bous et al. |
| 2009/0319362 A1 | 12/2009 | Dashnaw |
| 2010/0049601 A1 | 2/2010 | Walker et al. |
| 2010/0057586 A1 | 3/2010 | Chow |
| 2010/0063870 A1 | 3/2010 | Anderson et al. |
| 2010/0070288 A1 | 3/2010 | Pandey et al. |
| 2010/0070303 A1 | 3/2010 | Massoumi et al. |
| 2010/0076832 A1 | 3/2010 | Cha |
| 2010/0082481 A1 | 4/2010 | Lin et al. |
| 2010/0094701 A1 | 4/2010 | Ghosh et al. |
| 2010/0114132 A1 | 5/2010 | Piccionelli et al. |
| 2010/0146604 A1 | 6/2010 | Piccionelli |
| 2010/0185465 A1 | 7/2010 | Rana et al. |
| 2010/0205004 A1 | 8/2010 | Aldrich |
| 2010/0241513 A1 | 9/2010 | Prasad et al. |
| 2010/0262475 A1 | 10/2010 | Gavriline et al. |
| 2010/0287103 A1 | 11/2010 | Mason |
| 2011/0029362 A1 | 2/2011 | Roeding et al. |
| 2011/0029363 A1 | 2/2011 | Gillenson et al. |
| 2011/0035266 A1 | 2/2011 | Patterson |
| 2011/0040609 A1 | 2/2011 | Hawkins et al. |
| 2011/0054996 A1 | 3/2011 | Spector |
| 2011/0090080 A1 | 4/2011 | Yu |
| 2011/0099082 A1 | 4/2011 | Walker et al. |
| 2011/0106601 A1 | 5/2011 | Perlman et al. |
| 2011/0112892 A1 | 5/2011 | Tarantino |
| 2011/0153400 A1 | 6/2011 | Averbuch |
| 2011/0173096 A1 | 7/2011 | Bui |
| 2011/0213644 A1 | 9/2011 | Phene |
| 2011/0218911 A1 | 9/2011 | Spodak |
| 2011/0231321 A1 | 9/2011 | Milne |
| 2011/0238499 A1 | 9/2011 | Blackhurst et al. |
| 2011/0258049 A1 | 10/2011 | Ramer et al. |
| 2011/0264490 A1 | 10/2011 | Durvasula et al. |
| 2011/0313840 A1 | 12/2011 | Mason et al. |
| 2011/0313867 A9 | 12/2011 | Andrew |
| 2012/0016745 A1* | 1/2012 | Hendrickson .......... G06Q 30/02 705/14.66 |
| 2012/0030002 A1 | 2/2012 | Bous et al. |
| 2012/0030066 A1 | 2/2012 | Stringfellow et al. |
| 2012/0036042 A1 | 2/2012 | Graylin et al. |
| 2012/0054031 A9 | 3/2012 | Walker et al. |
| 2012/0084124 A1 | 4/2012 | Reis |
| 2012/0084128 A1 | 4/2012 | Murphy et al. |
| 2012/0088487 A1 | 4/2012 | Khan |
| 2012/0095817 A1 | 4/2012 | Kamil et al. |
| 2012/0095852 A1 | 4/2012 | Bauer et al. |
| 2012/0101881 A1 | 4/2012 | Taylor et al. |
| 2012/0101889 A1 | 4/2012 | Kurata et al. |
| 2012/0130796 A1 | 5/2012 | Busch |
| 2012/0150603 A1 | 6/2012 | Bennett et al. |
| 2012/0150653 A1 | 6/2012 | Bennett et al. |
| 2012/0172062 A1 | 7/2012 | Altman et al. |
| 2012/0173350 A1 | 7/2012 | Robson |
| 2012/0209730 A1 | 8/2012 | Garrett |
| 2012/0254020 A1 | 10/2012 | Debow |
| 2012/0259711 A1 | 10/2012 | Jabbawy |
| 2012/0284100 A1 | 11/2012 | Goldberg |

(56) References Cited

U.S. PATENT DOCUMENTS

| | | |
|---|---|---|
| 2012/0303434 A1 | 11/2012 | Postrel |
| 2012/0323661 A1 | 12/2012 | Otto et al. |
| 2013/0024364 A1 | 1/2013 | Shrivastava et al. |
| 2013/0085804 A1 | 4/2013 | Leff et al. |
| 2013/0124281 A1 | 5/2013 | Evans et al. |
| 2013/0231999 A1 | 9/2013 | Emrich et al. |
| 2013/0254104 A1 | 9/2013 | Fernandez |
| 2013/0275242 A1 | 10/2013 | Ramaratnam et al. |
| 2013/0317894 A1 | 11/2013 | Zhu et al. |
| 2014/0046757 A1 | 2/2014 | Kahn et al. |
| 2014/0074580 A1 | 3/2014 | Khuchua-Edelman et al. |
| 2014/0074595 A1 | 3/2014 | Chomsky et al. |
| 2014/0095232 A1 | 4/2014 | Shiva et al. |
| 2014/0114746 A1 | 4/2014 | Pani et al. |
| 2014/0122200 A1 | 5/2014 | Granville |
| 2014/0207584 A1 | 7/2014 | Wicha et al. |
| 2014/0214534 A1 | 7/2014 | L'Heureux et al. |
| 2015/0046271 A1 | 2/2015 | Scholl et al. |
| 2015/0278864 A1 | 10/2015 | McDevitt |

FOREIGN PATENT DOCUMENTS

| | | |
|---|---|---|
| WO | 00/79495 A2 | 12/2000 |
| WO | 01/08024 A2 | 2/2001 |
| WO | 01/11483 A2 | 2/2001 |
| WO | 01/50301 A2 | 7/2001 |
| WO | 2009/094385 A2 | 7/2009 |
| WO | 2011/112752 A1 | 9/2011 |
| WO | 2014/052882 A2 | 4/2014 |
| WO | 2014/062229 A1 | 4/2014 |
| WO | 2014/062230 A1 | 4/2014 |

OTHER PUBLICATIONS

"Next Step for Groupon Scheduler," Groublogpon—The Sereous Blog of Froupon, Mar. 18, 2012. [Retrieved from the Internet Mar. 26, 2012: <http://www.groupon.com/blog/cities.next-step-groupon-scheduler/>.

Alan S. Davis "Group Buying on the Internet", Seminar Presentation Slides, University of Minnesota, MIS Research Center, Mar. 10, 2006. ; ,'.

Bermant, Charles, "ActBig: Save BiG", Internetnews.com, Nov. 16, 1999, 3 pgs.

Editor, "Technology Drives ActBig 'Next Generation' GroupBuying Application", Market Wire, Feb. 29, 2005.

International Search Report and Written Opinion for Application No. PCT/US2012/027616 dated Sep. 27, 2012.

Kauffman, Robert J. et al., "Bid Together, Buy Together: On The Efficacy Of Group-Buying Business Models In Internet Based Selling", paper prepared for the 5th Annual University of Minnesota Electronic Commerce conference, Mar. 27-28, 2001, Carlson School of Management, University of Minnesota, MN, 44 pgs.

Kothari et al., Robust Indoor Localization on a Commercial Smart Phone, 7 pages, downloaded from www.sciencedirect.com on Mar. 29, 2022. (Year: 2012).

Krishnan S. Anand and Ravi Aron (OPIM Department, The Wharton School, University of Pennsylvania), "Group Buying on the Web: A Comparison of Price Discovery Mechanisms", Management Science, vol. 49, No. 11, pp. 1546-1562, Nov. 2003.

PCT international Preliminary Report on Patentability for Application PCT/US2013/033145 issued Apr. 21, 2015.

PCT international Preliminary Report on Patentability for Application PCT/US2013/033169 issued Apr. 21, 2015.

PCT international Preliminary Report on Patentability for Application PCT/US2013/062389 issued Mar. 31, 2015.

PCT International Search Report and Written Opinion of the International Searching Authority for application PCT/ JS2013/062389 mailed May 27, 2014.

PCT international Search Report and Written Opinion of the International Searching Authority for Application PCT/US2013/033145 mailed Jun. 21, 2013.

PCT international Search Report for Application PCT/US2013/033169 mailed Jun. 10, 2013.

PCT Written Opinion of the International Searching Authority for Application PCT/US2013/033169 mailed Jun. 10, 2013.

Rueb, Emily S., "Group Buying, Better Together", The New York Times City Blog, Feb. 16, 2010, 3 pgs.

Staff, "ActBig.com muscles in on group buying power", RedHerring. com, Oct. 13, 1999.

U.S. Patent Application filed Mar. 15, 2013, U.S. Appl. No. 13/832,804.

U.S. Patent Application filed Sep. 28, 2012, In re: Shiva entitled "Scheduling Appointments With Deal Offers", U.S. Appl. No. 13/631,313.

U.S. Provisional Application filed Aug. 13, 2012, In re: Shariff et al. entitled Unified payment and Return On Investment System, U.S. Appl. No. 61/682,762.

U.S. Provisional Application filed Jun. 18, 2012, In re: Kim et al. entitled Facilitating Consumer Payments And Redemptions Of Deal Offers, U.S. Appl. No. 61/661,291.

U.S. Provisional Application filed Mar. 30, 2012, In re: Kim entitled "Generating Deal Offers and Providing Analytics Data", U.S. Appl. No. 61/618,338.

U.S. Provisional Application filed May 17, 2013; In re: Kahn et al., entitled Unified Payment and Return on Investment System, U.S. Appl. No. 61/824,850.

U.S. Provisional Patent Application filed Feb. 27, 2013, U.S. Appl. No. 61/770,174.

Annex to the communication Mailed on Jan. 31, 2019 for EP Application No. 12752561, 7 page(s).

Annex to the communication Mailed on Sep. 17, 2018 for EP Application No. 12752561, 6 page(s).

Annex to the communication Mailed on Sep. 27, 2017 for EP Application No. 12752561, 4 page(s).

Communication from the Examining Division Mailed on Sep. 27, 2017 for EP Application No. 12752561, 2 page(s).

European search opinion Mailed on Jul. 21, 2014 for EP Application No. 12752561, 2 page(s).

IPEA/409—International Preliminary Report on Patentability Mailed on Apr. 9, 2015 for WO Application No. PCT/US13/062389, 7 page(s).

ISA/206—Invitation to Pay Additional Fees Mailed on Mar. 27, 2014 for WO Application No. PCT/US13/062389, 2 page(s).

ISA/220—Notification of Transmittal or Search Report and Written Opinion of the ISA, or the Declaration Mailed on May 27, 2014 for WO Application No. PCT/US13/062389, 1 page(s).

Outgoing—ISA/210—International Search Report and Written Opinion Mailed on May 27, 2014 for WO Application No. PCT/US13/062389, 9 page(s).

Statement in Accordance With The Notice From the European Patent Office Concerning Business Methods, dated Oct. 1, 2007, 9 pages.

Supplementary European search report Mailed on Jul. 21, 2014 for EP Application No. 12752561, 1 page(s).

Fu-Ren Lin and Kuang-Yi Chang, "A multiagent framework for automated online bargaining," in IEEE Intelligent Systems, vol. 16, No. 4, pp. 41-47, Jul.-Aug. 2001, doi: 10.1109/5254.941356. (Year: 2001).

Robert J. Kauffman and Bin Wang, "Bid Together, Buy Together. On the Efficacy of Group-Buying Business Models in Internet-Based Selling"; "The (R)evolution Goes Mobile", 5th Annual University of Minnesota Electronic Commerce Conference, Mar. 27-28, 2001, Carlson School of Management, University of Minnesota, Minneapolis Minnesota.

T. Bruggemann and M. H. Breitner, "Mobile Price Comparison Services, "Second IEEE International Workshop on Mobile Commerce and Services, Munich, Germany, 2005, pp. 193-201, doi: 10.1109/WMCS.2005.15. (Year 2005).

T. C. Du and H. -L. Chen, "Building a Multiple-Criteria Negotiation Support System," in IEEE Transactions on Knowledge and Data Engineering, vol. 19, No. 6, pp. 804-817, Jun. 2007, doi: 10.1109/TKDE.2007.1018. (Year: 2007).

(56) References Cited

OTHER PUBLICATIONS

V. Jayaraman and T. Baker, "The Internet as an enabler for dynamic pricing of goods, " in IEEE Transactions on Engineering Management, vol. 50, No. 4, pp. 470-477, Nov. 2003, doi: 10.1109/TEM.2003.820.134. (Year 2003).

* cited by examiner

| Merchant Center ID | Merchant User ID | Transaction ID | Voucher ID | Date | Transaction Amount | Voucher Redemption Value | Tax Amount | Payment Type | Credit Card Number | Other Payment Account Number |
|---|---|---|---|---|---|---|---|---|---|---|

FIG.21

| Voucher ID | Consumer ID | Merchant Center ID | Date | Credit Card Number | Purcahse Value | Discount Value | Validity Period | Redemption Status | Redemption Value |
|---|---|---|---|---|---|---|---|---|---|

FIG.22

ONLINE ORDERING FOR IN-SHOP SERVICE

CROSS-REFERENCE TO RELATED APPLICATIONS

The present application is a continuation of U.S. patent application Ser. No. 16/891,743, filed Jun. 3, 2020 (now U.S. Pat. No. 11,615,459), which is a continuation of U.S. patent application Ser. No. 16/176,793, filed Oct. 31, 2018 (now U.S. Pat. No. 10,713,707), which is a continuation of U.S. patent application Ser. No. 13/839,414, filed Mar. 15, 2013 (now U.S. Pat. No. 10,147,130), which claims priority from U.S. Provisional Application No. 61/706,664, filed Sep. 27, 2012, each of which is incorporated by reference in its entirety for all purposes.

FIELD

Embodiments of the invention relate, generally, to facilitating a consumer's ordering of a products provided by a merchant.

BACKGROUND

Merchants, such as restaurants, sometimes make their menus available online to anyone having Internet access. Consumers can then view the menus using a computer, smartphone or other networked device, and make dining decisions (e.g., where to dine, what to order, etc.). In this regard, areas for improving current online systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, improve merchant online ordering, scheduling and promotional systems. More specifically, embodiments provided herein may include an online ordering system that may be implemented to provide consumers an option for in-restaurant dining.

In some embodiments, a method provides for ordering menu items from a restaurant. The method may include: receiving menu items offered for sale by the restaurant; generating, by a networked processor, menu information based on the menu items, wherein the menu information is configured to facilitate point-of-sale (sometimes referred to herein as "POS") functionality at the restaurant; generating an online menu including a first set of menu items using the menu information; providing the online menu to a consumer device associated with a consumer; receiving, from the consumer device, online order data associated with an online order indicating at least one item from the first set of menu items; and receiving, from a restaurant device (e.g., a merchant device and/or POS device located at the restaurant), in-restaurant order data associated with the online order indicating at least a second menu item.

In some embodiments, the method may further include: transmitting point-of-sale data indicating the least one item to a merchant device (e.g., the restaurant device); and determining a trigger condition to begin preparation of the online order.

In some embodiments, the method may further include receiving an indication of a dine-in selection for the online order. As such, the trigger condition to begin preparation of the online order may be based on one or more of a location of the consumer device, a reservation time for the dine-in selection, preparation time of the online order, and size of the online order.

In some embodiments, the method may further include: prior to receiving the online order data, associating the consumer with a payment account. For example, before a consumer enters an order, the consumer may be prompted to login and/or otherwise provide identification. As such, customized recommendations may be provided to the consumer. Furthermore, subsequent to an occurrence of the trigger condition, the method may include facilitating a financial transaction using the payment account.

In some embodiments, the method may further include: receiving an additional order of an additional item subsequent to receiving the online order data; and associating the additional item with the payment account before facilitating the financial transaction. For example, a consumer may update an online order. In some embodiments, the consumer may perform the update online and/or via a merchant (e.g., by phone or in person at the restaurant).

In some embodiments, an unpaid amount may be associated with the payment account. For example, a consumer may not be required to provide a form of payment at the merchant. Instead, a meal may be charged to the payment account. In another example, one or more consumers may share a tab, with one or more shares of the tab being paid with one or more payment accounts.

In some embodiments, the method may further include: associating the online food order with a plurality of payment accounts; receiving payment data indicating how to allocate payment amounts among the plurality of payment accounts; and facilitating financial transactions using the plurality of payment accounts according to the payment data. For example, the payment data may indicate a ratio for allocating the payment amounts among the plurality of payment accounts. As such, financial transactions may be facilitated in accordance with the ratio.

In some embodiments, the method may further include: receiving an indication to cancel the online order; and responsive to receiving the indication to cancel the online order, canceling preparation of the online order. For example, prior to occurrence of the trigger condition to begin preparation, the trigger condition may be canceled or otherwise made ineffective such that preparation does not begin.

In some embodiments, the method may further include: accessing a waitlist indicating table wait times; adding an entry to the waitlist for a table based on a request received from the consumer device; sending an estimated seating time for the table to the consumer device; associating the online order data with the entry to the waitlist; and sending an indication that the table is available to the consumer device. Furthermore, a trigger condition to begin preparing the online order may be based upon the estimated seating time.

Some embodiments provide a method for managing a menu database. The method may include accessing menu information from the menu database indicating amounts of menu items that are in stock. The menu database may be configured to support displays presented by a point-of-sale device in a restaurant and/or an online menu accessible by a consumer device located remote from the restaurant. The method may further include updating menu information. In response to the menu information being updated, the method may include updating menu items included in the online menu and/or the displays presented by the point-of-sale device.

In some embodiments, the method may further include updating the menu information based on an online order. In turn, the online menu may be further updated based on changes to the menu information as a result of the online order. As such, the method may further include removing at least one out of stock menu item from the online menu.

Some embodiments may include an apparatus and/or system configured to implement the methods and/or other functionality discussed herein. In other words, the apparatus may include one or more processors and/or other machine components configured to implement the functionality discussed herein based on instructions and/or other data stored in memory and/or other non-transitory computer readable media.

These characteristics as well as additional features, functions, and details of the present invention are described below. Similarly, corresponding and additional embodiments are also described below.

BRIEF DESCRIPTION OF THE DRAWINGS

Figure 8:
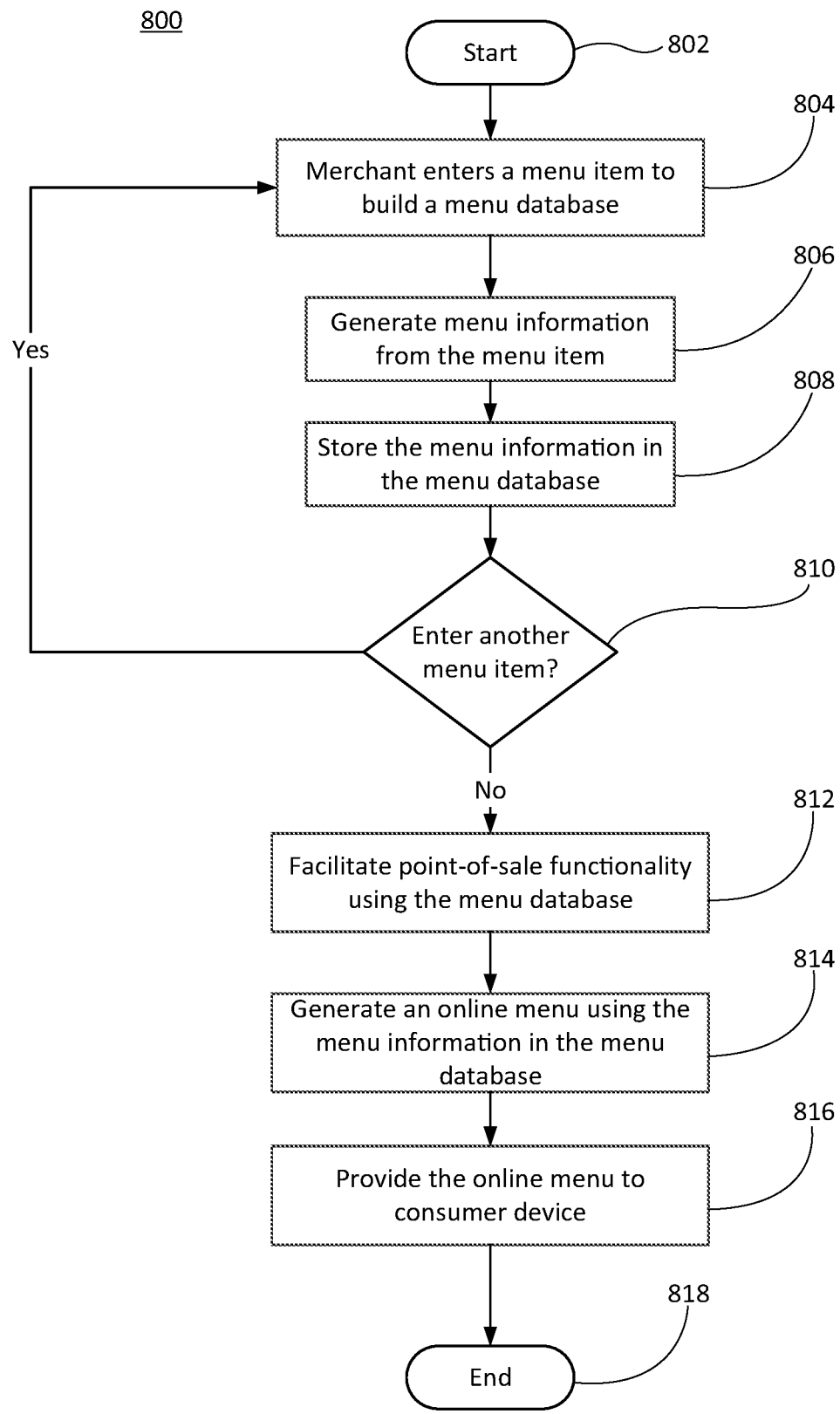
Figure 9:
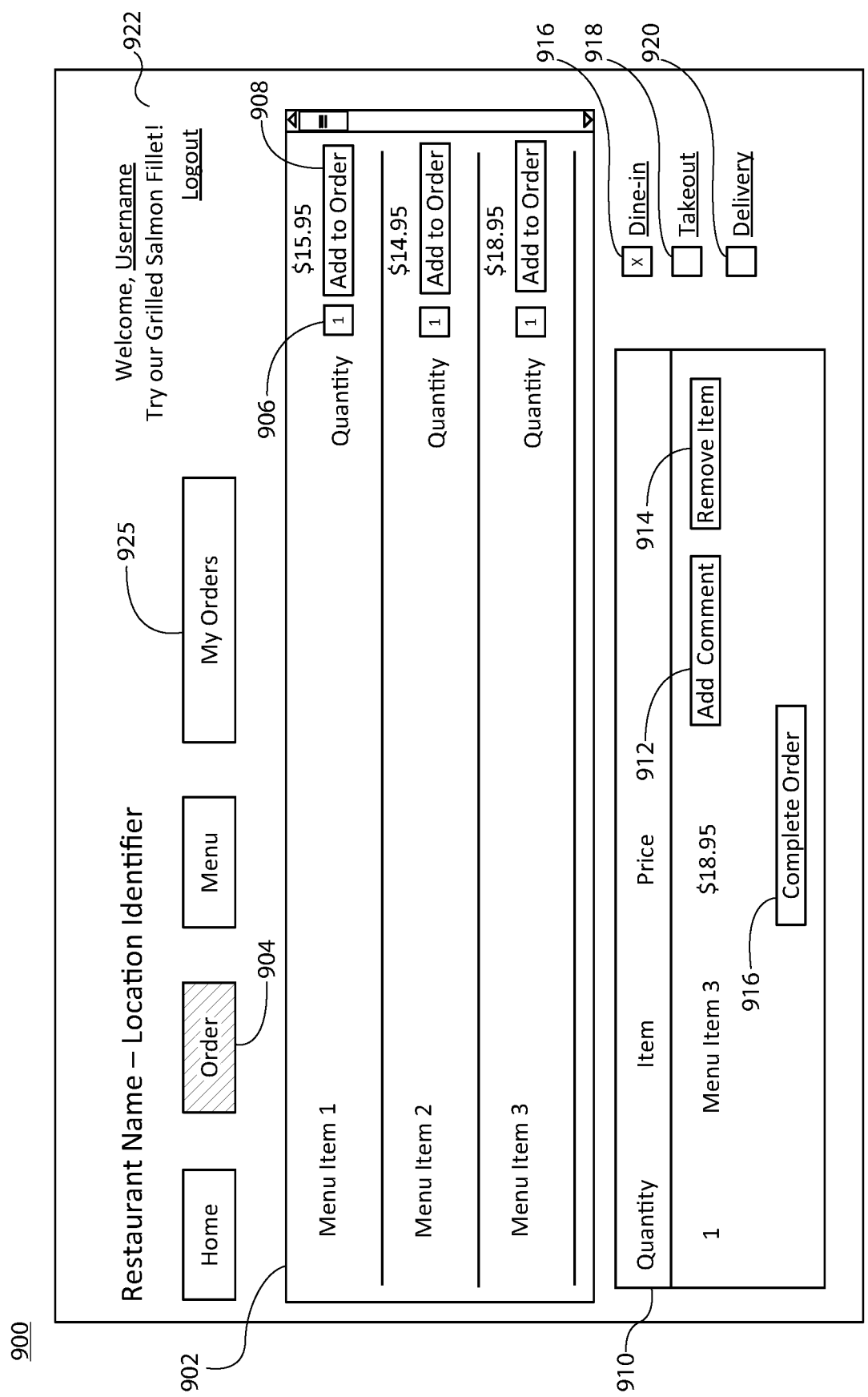
Figure 10:
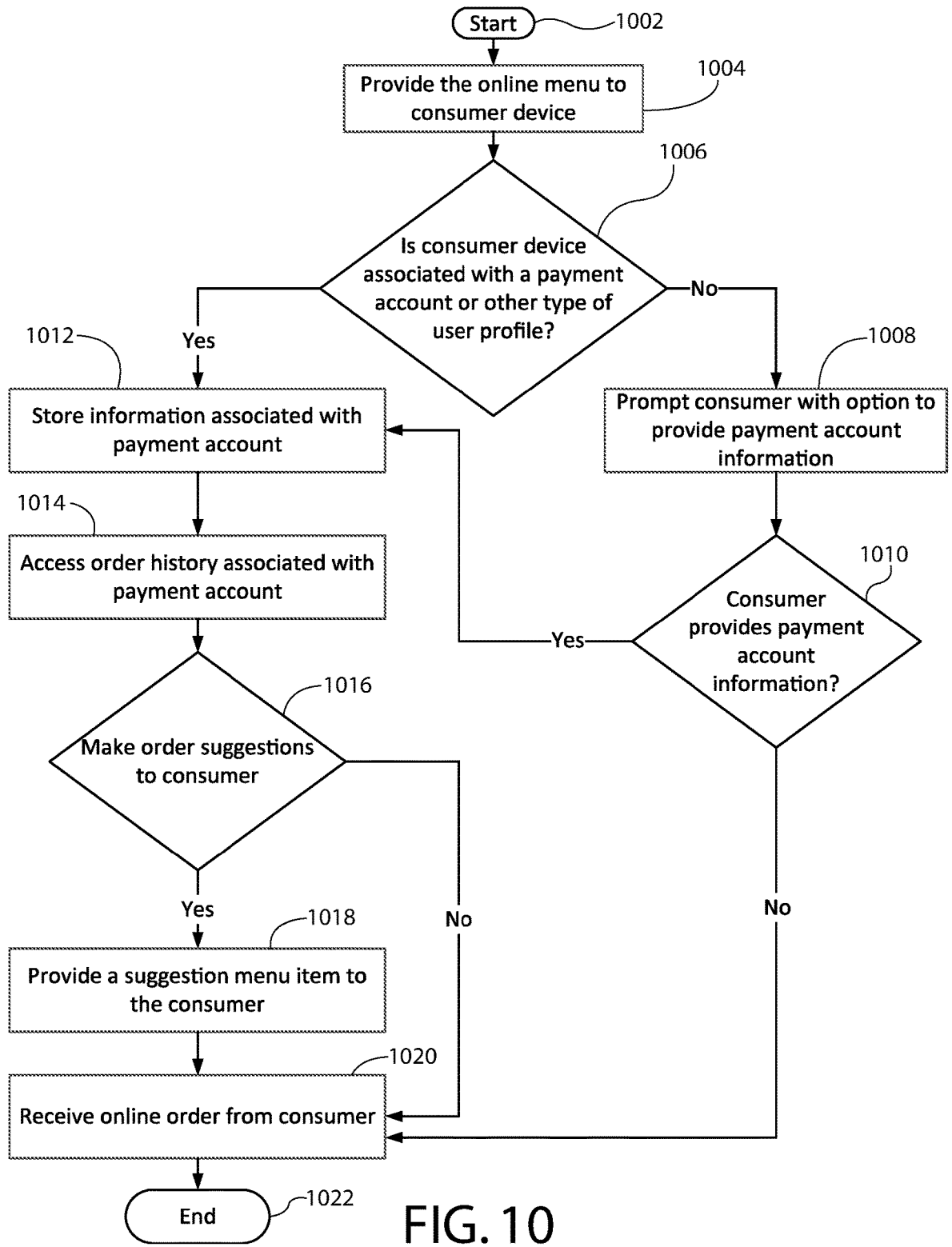
Figure 11:
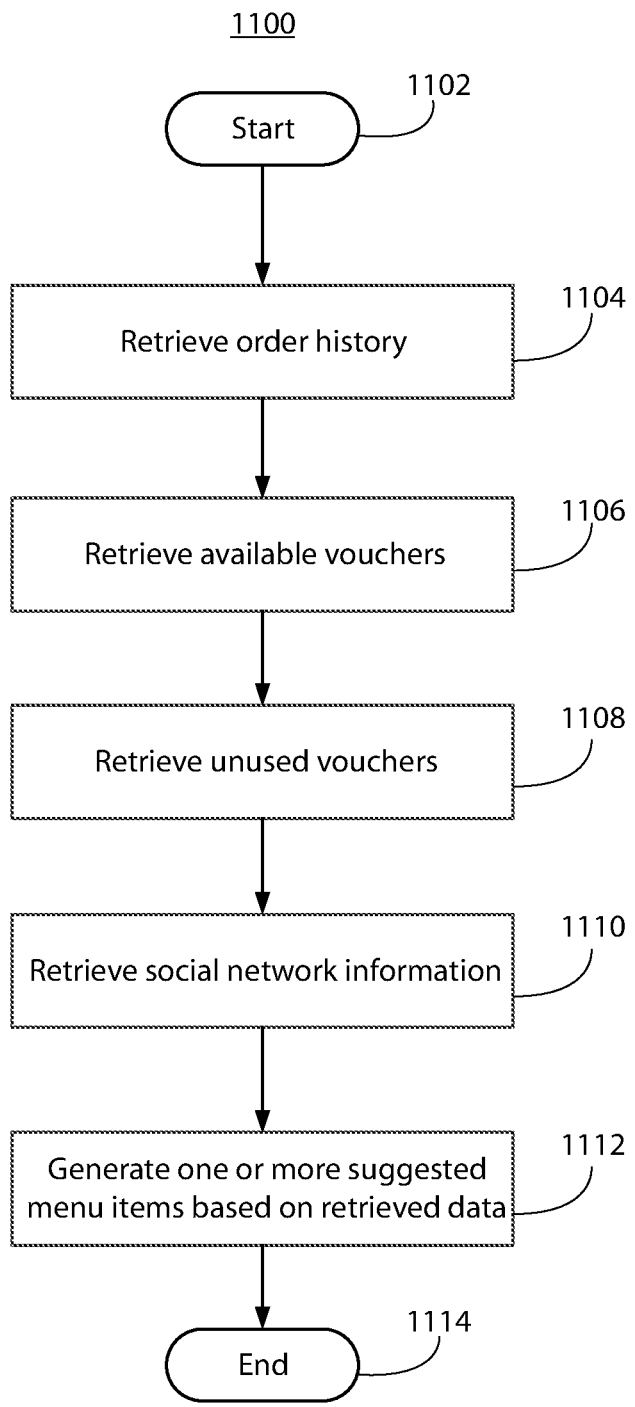
Figure 12:
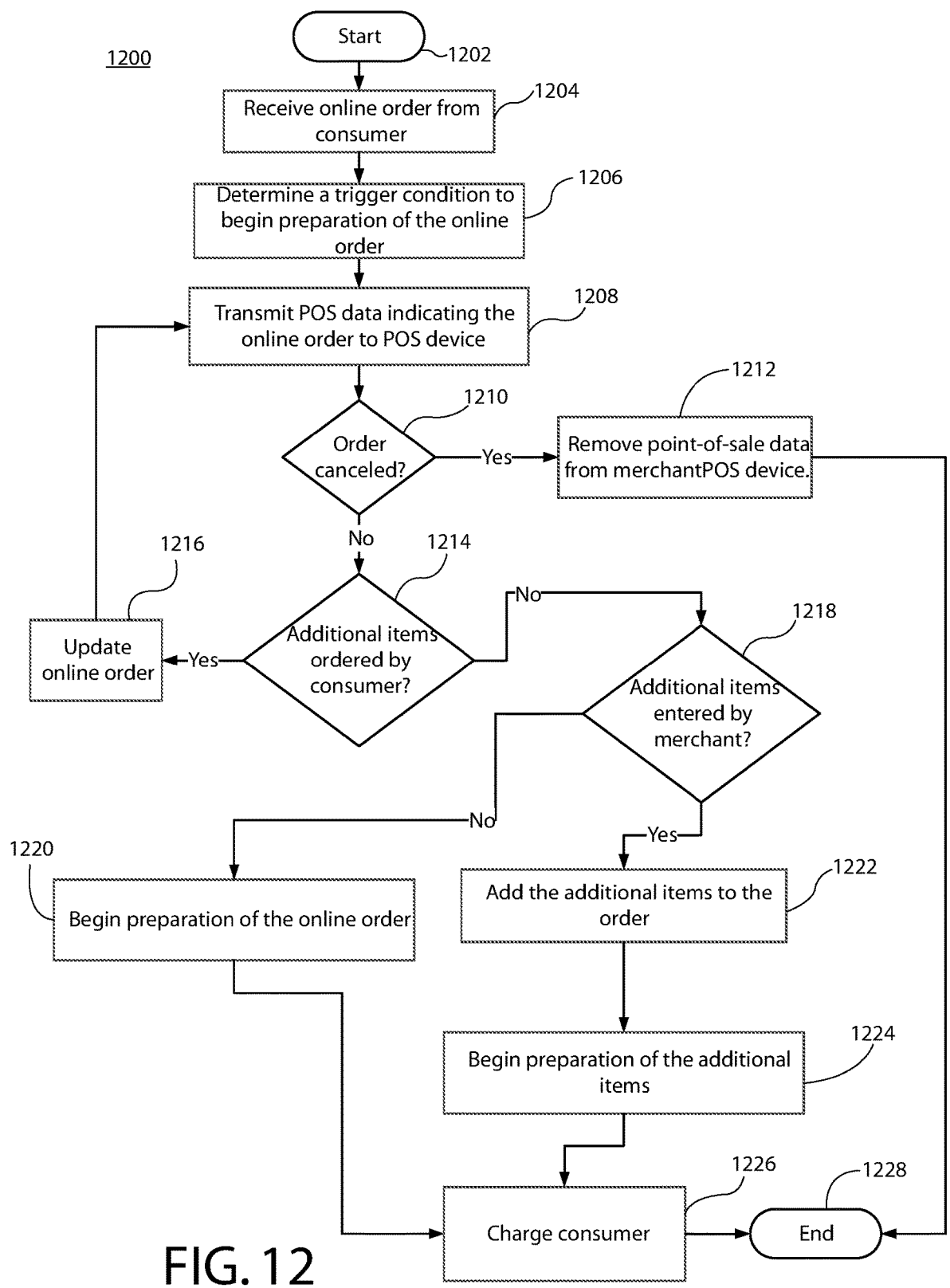
Figure 13:
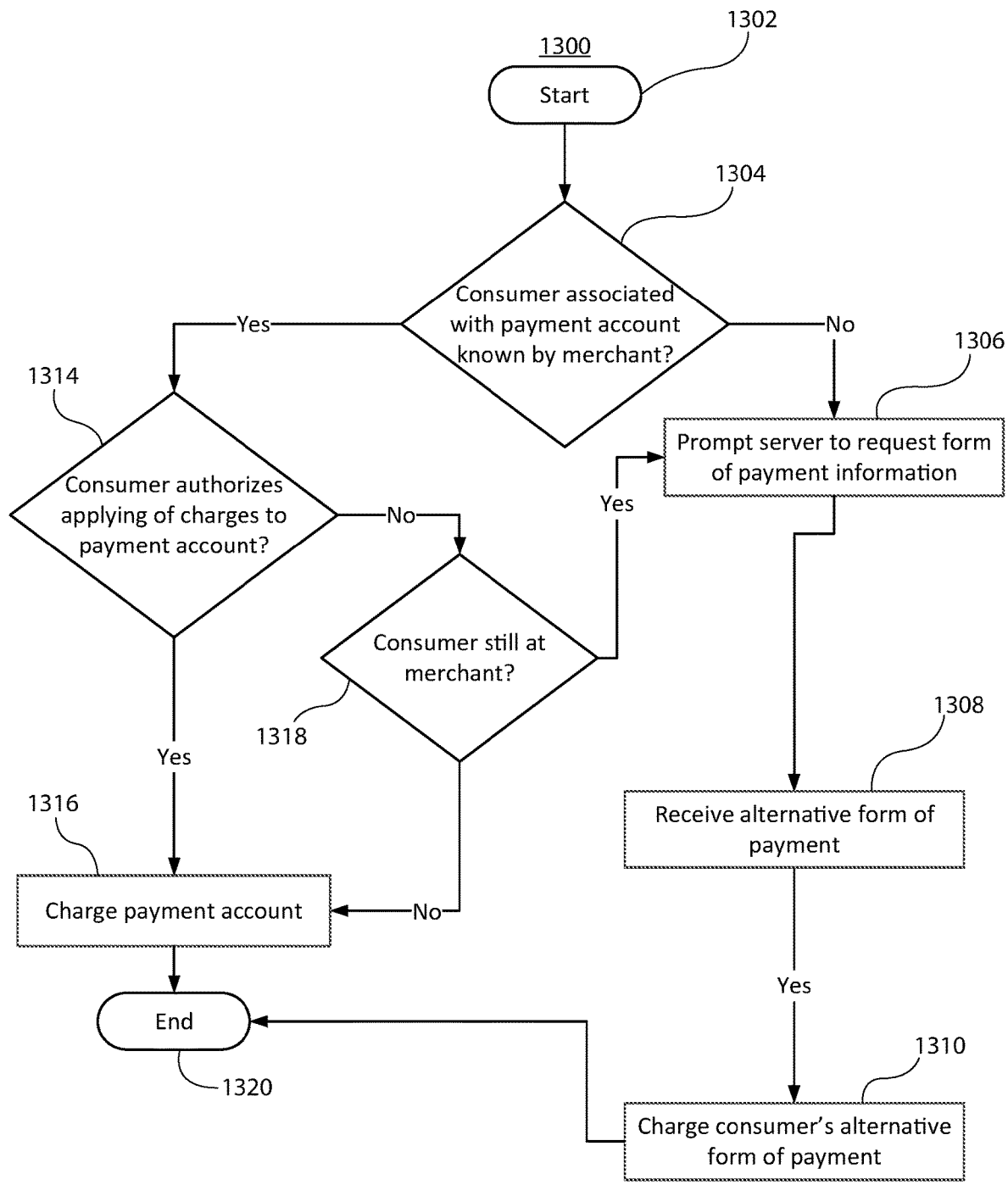
Figure 14:
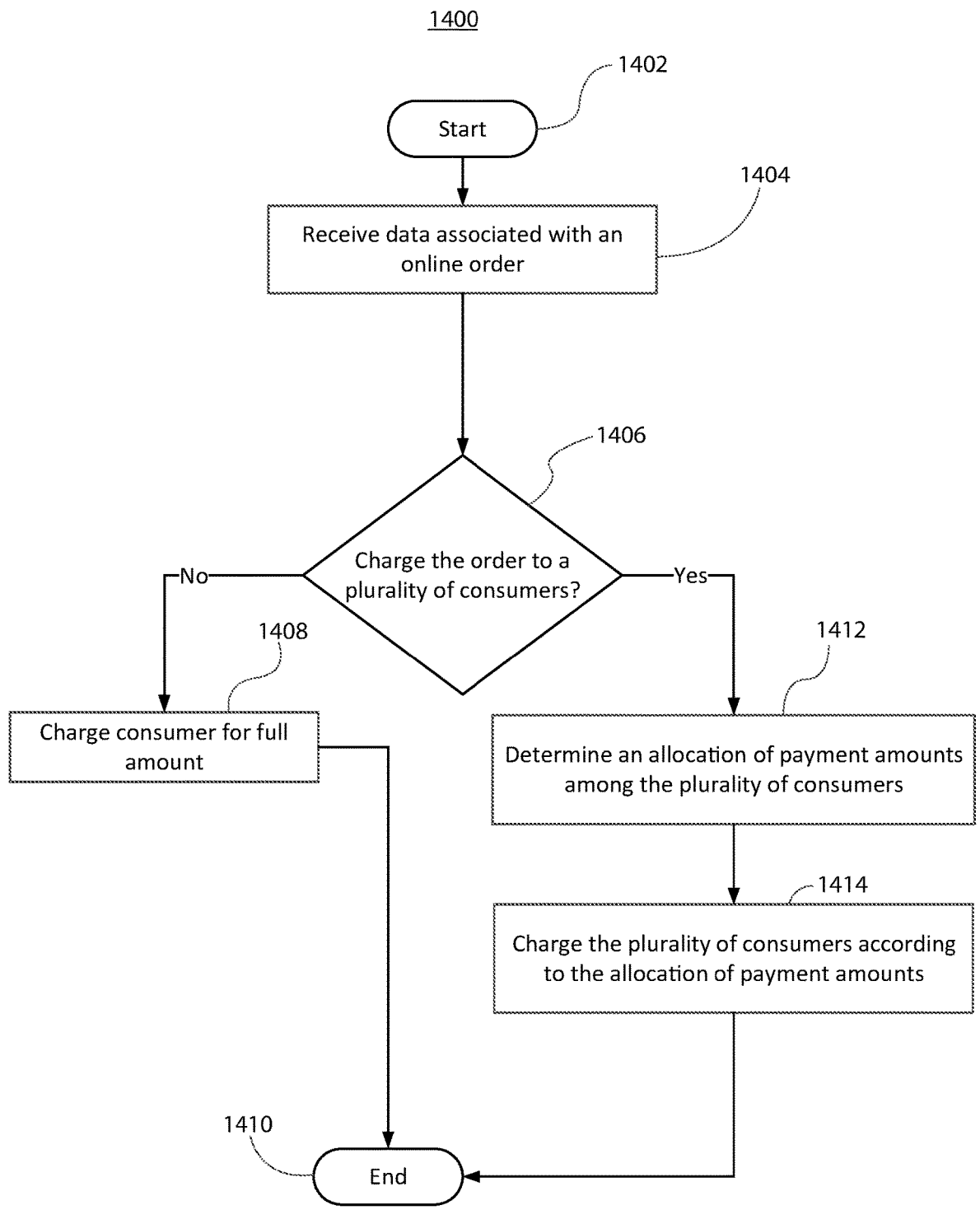
Figure 15:
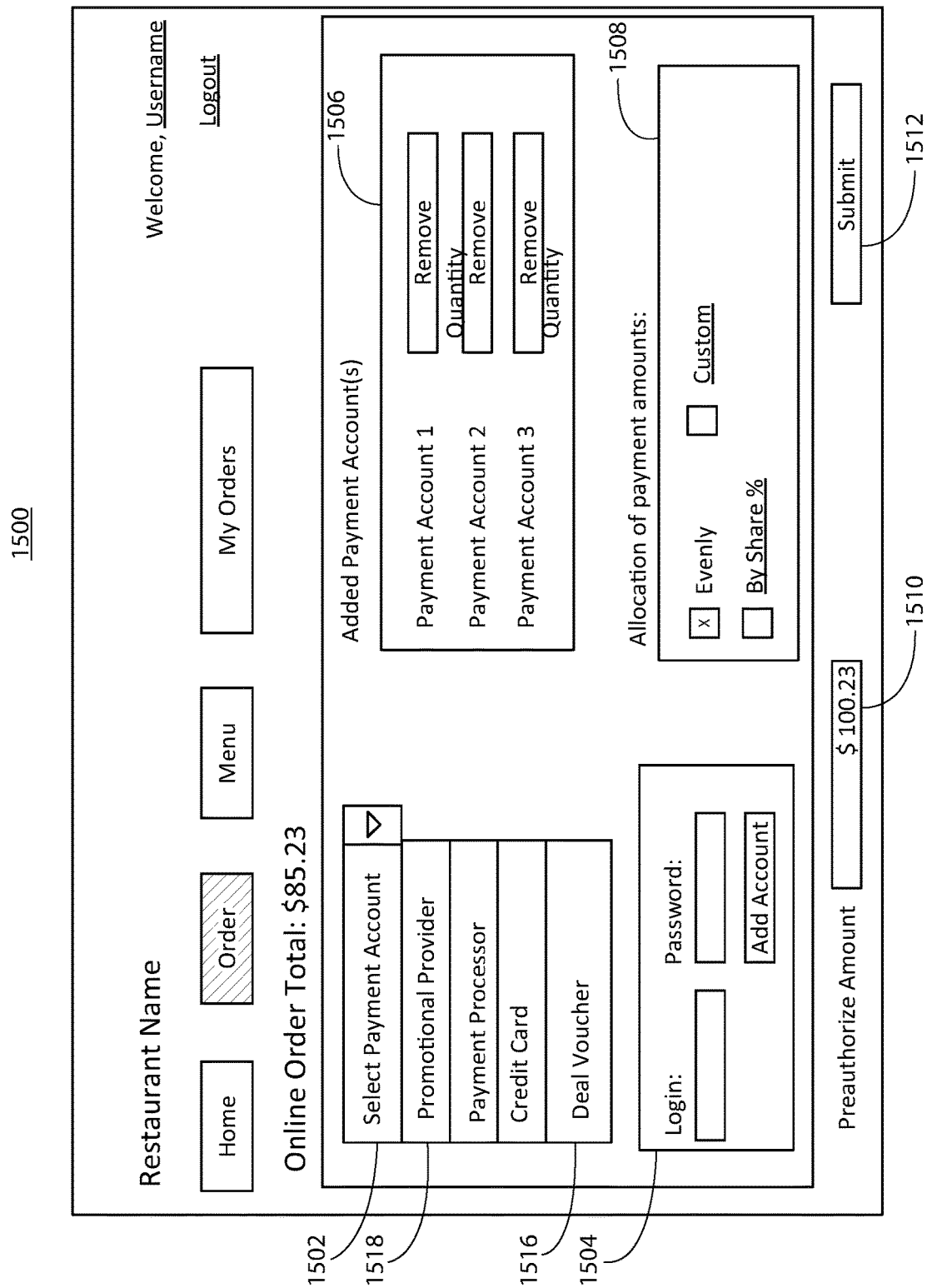
Figure 16:
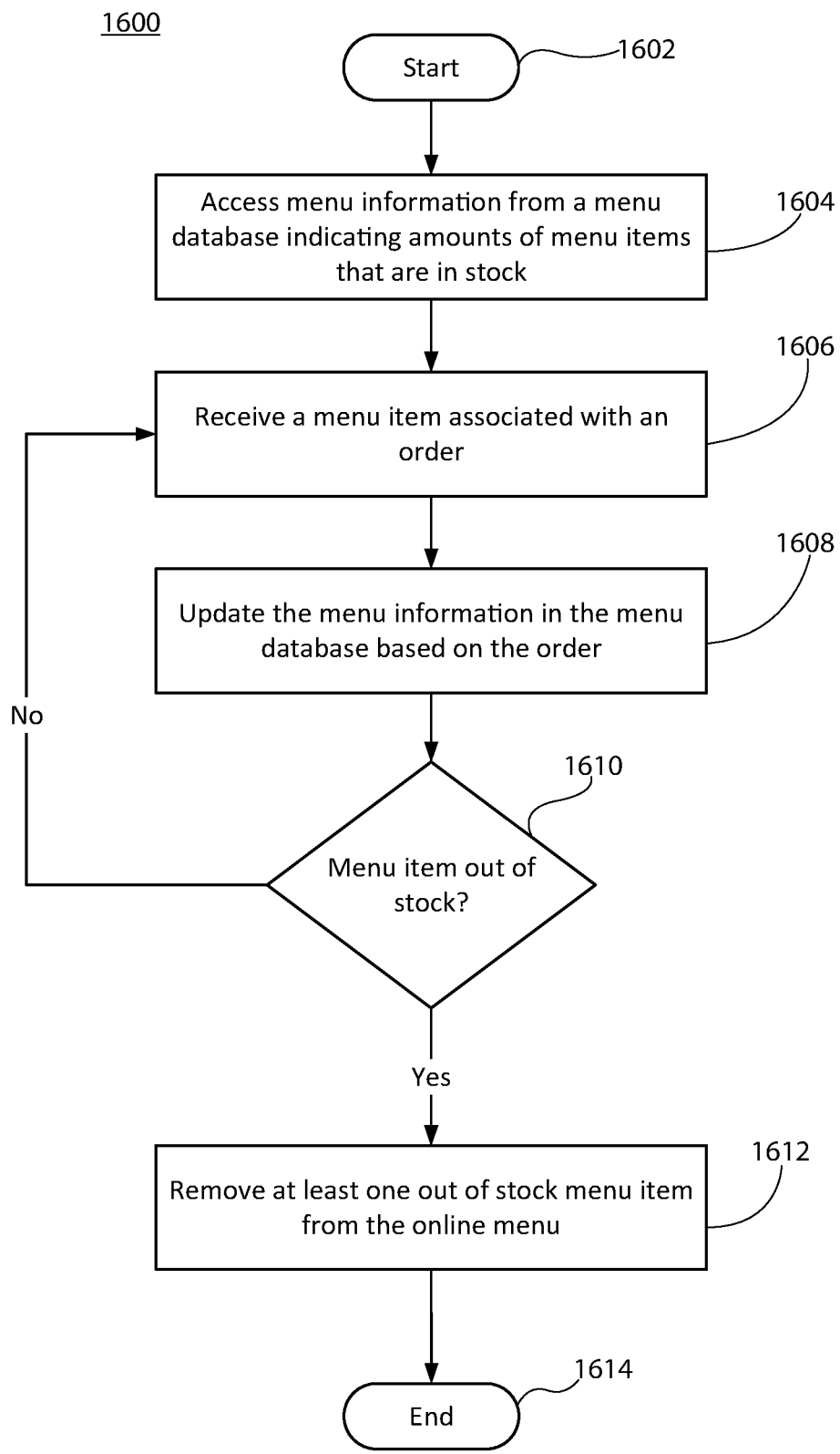
Figure 17:
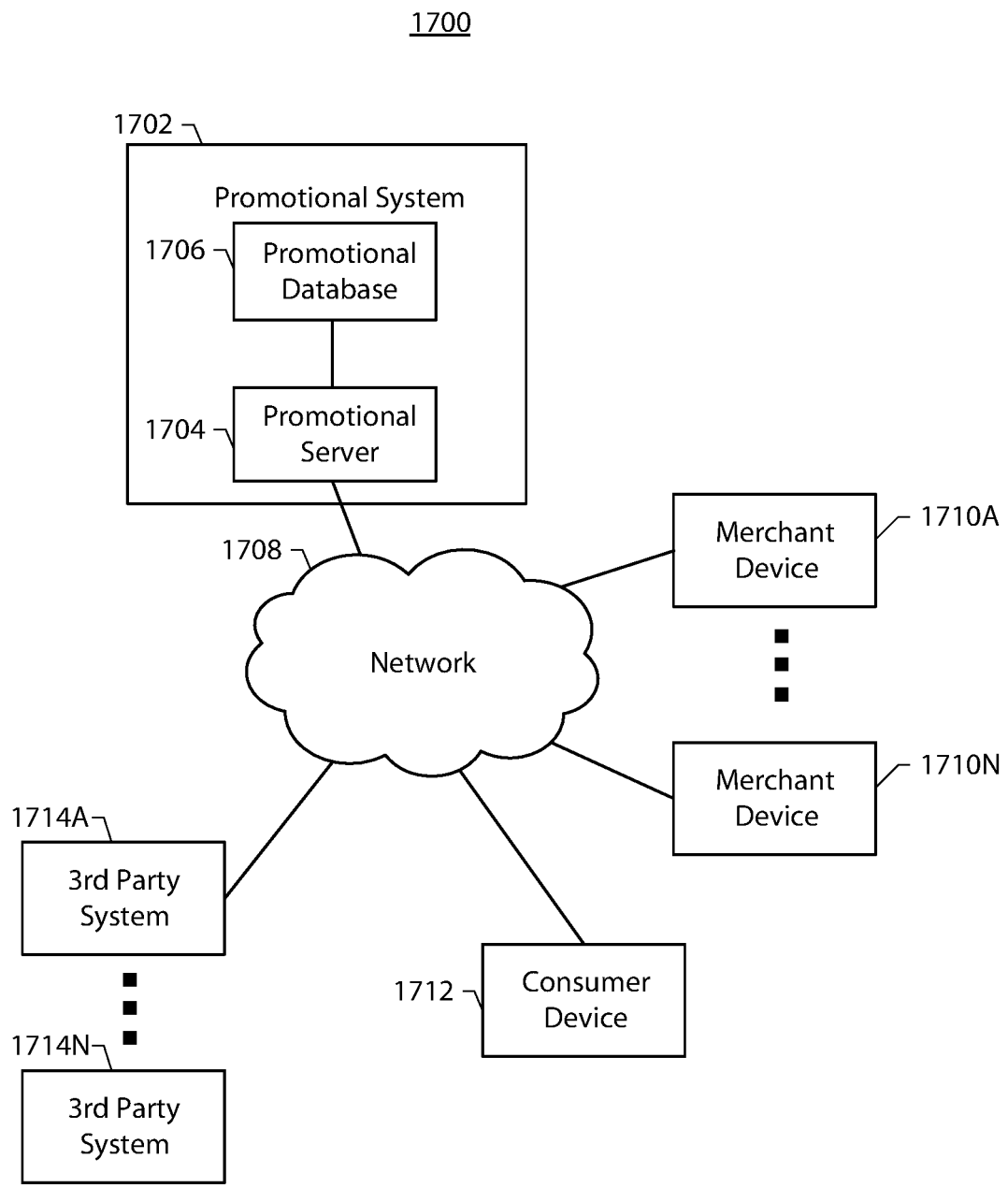
Figure 18:
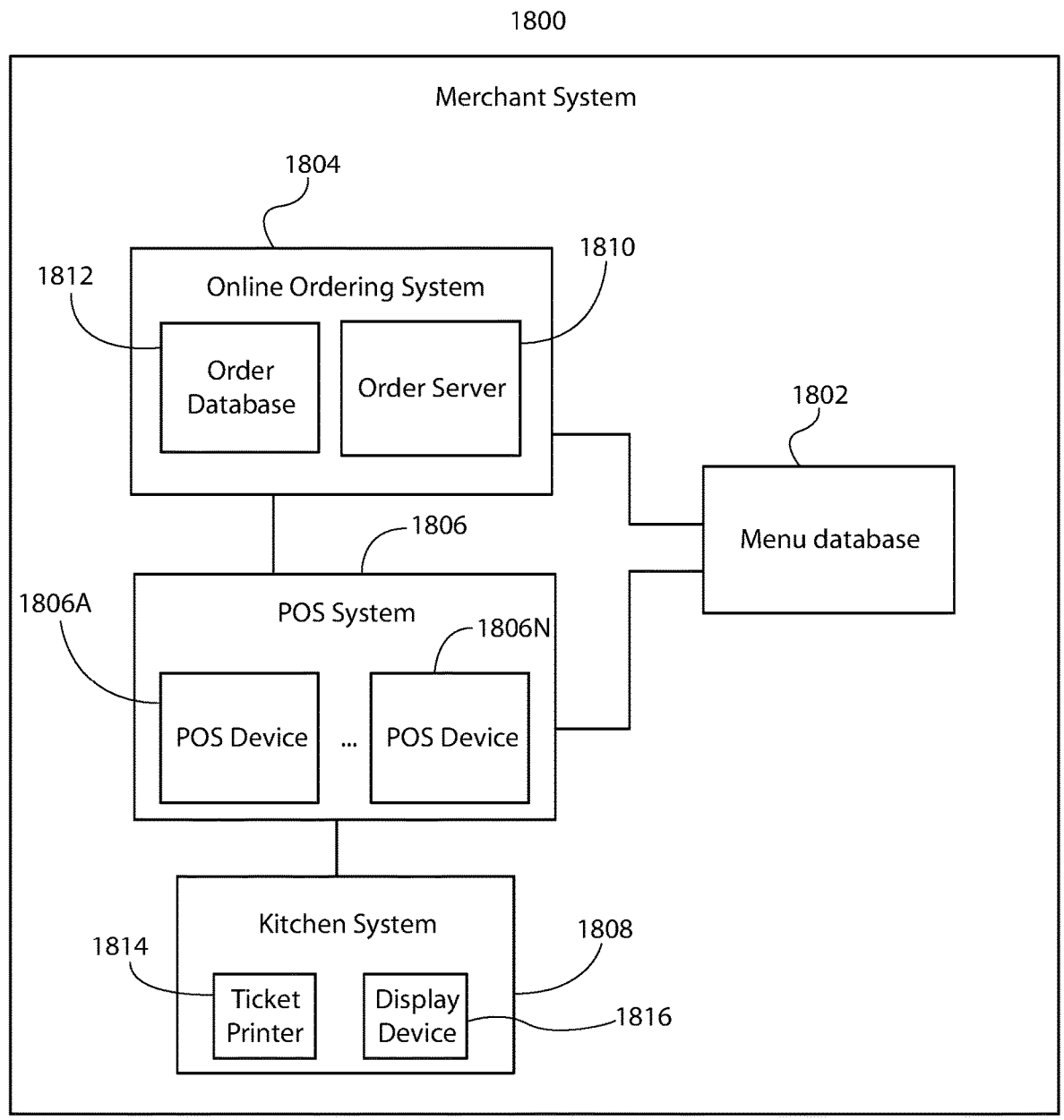
Figure 19:
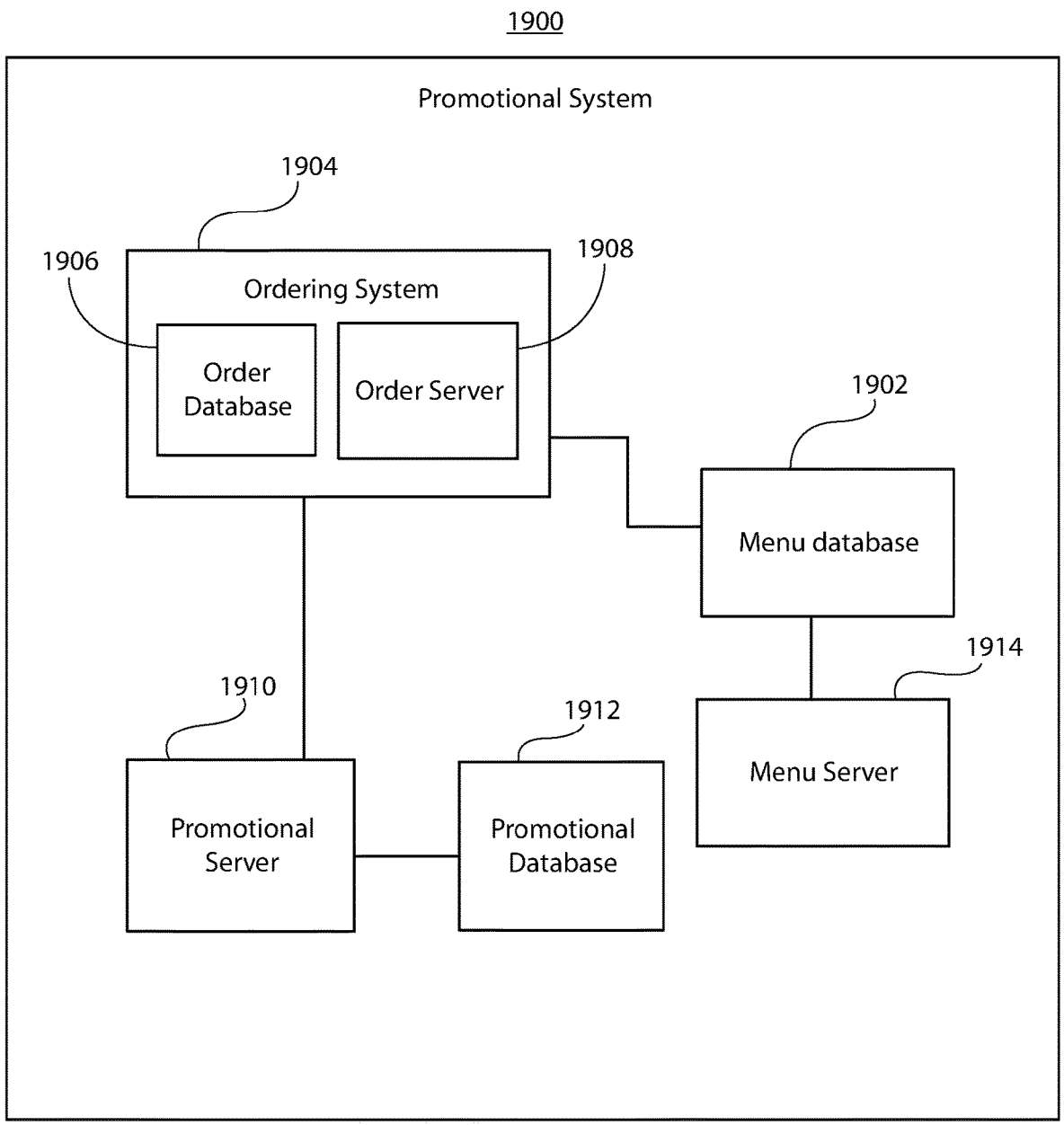
Figure 20:
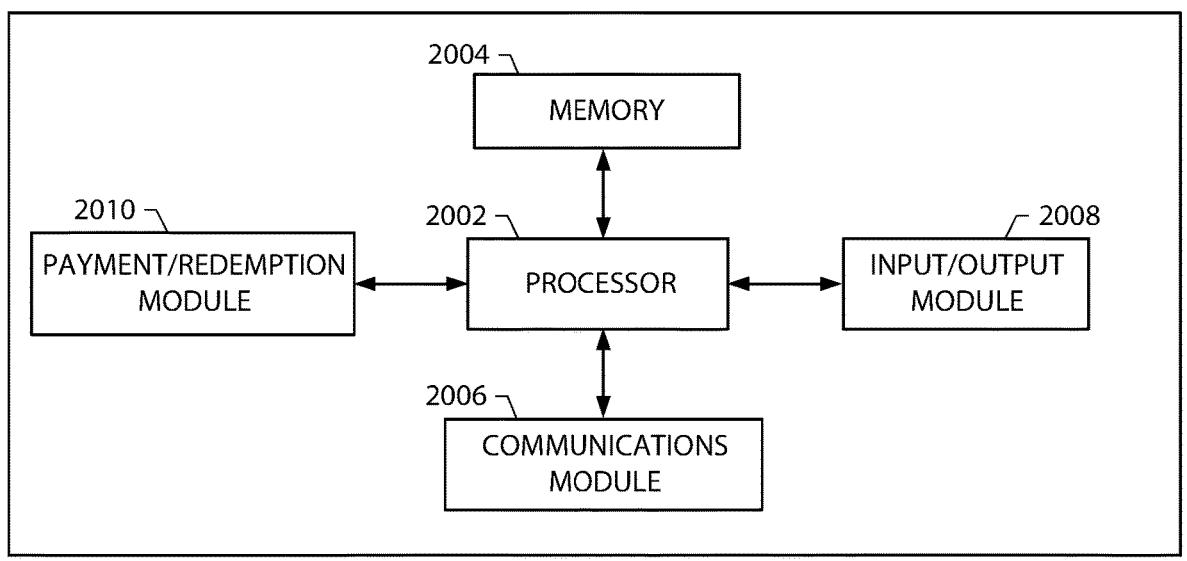
Figure 23:
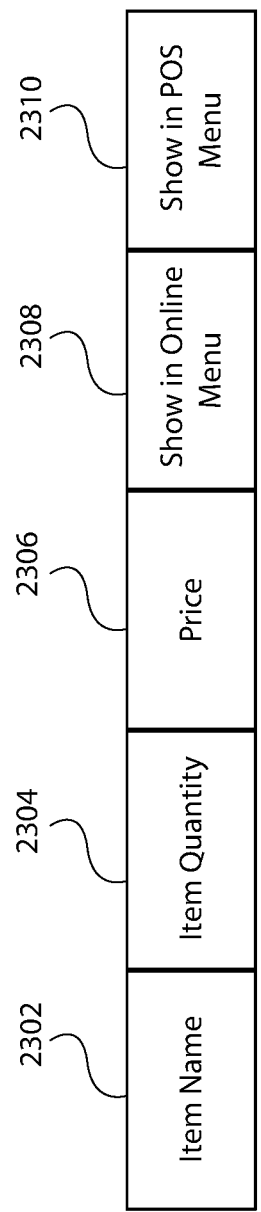
Figure 24:
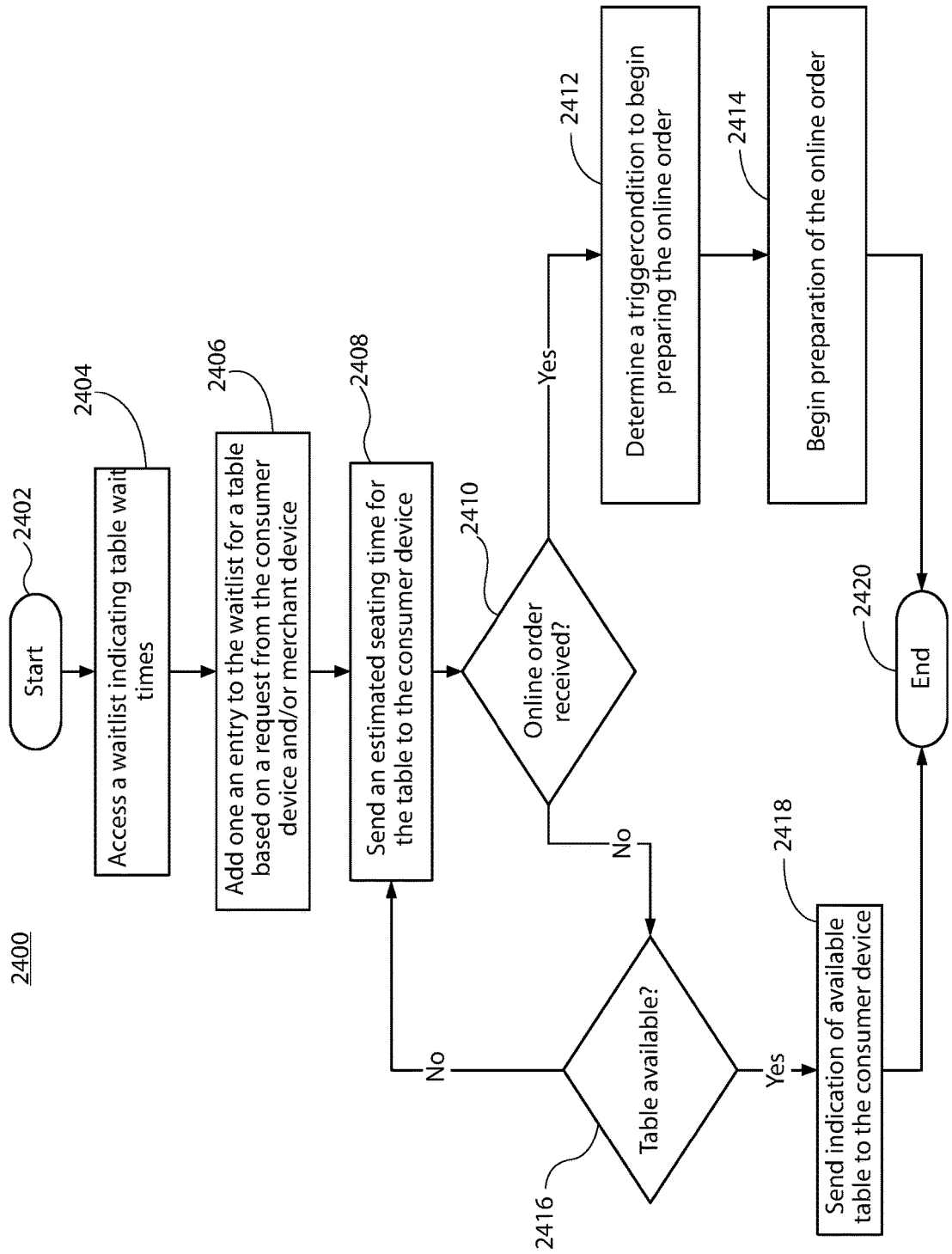

Having thus described embodiments of the invention in general terms, reference will now be made to the accompanying drawings, which are not necessarily drawn to scale, and wherein:

FIGS. 1-7 show example graphical user interface displays that may be presented by various components of systems, in accordance with some embodiments;

FIG. 8 shows a flow chart of an example method for utilizing a menu database, performed in accordance with some embodiments;

FIG. 9 shows an example online menu, in accordance with some embodiments;

FIG. 10 shows a flow chart of an example method for providing online ordering, performed in accordance with some embodiments;

FIG. 11 shows a flow chart of an example method for generating and/or providing order suggestions, performed in accordance with some embodiments;

FIG. 12 shows a flow chart of an example method for providing an online order to a POS system, performed in accordance with some embodiments;

FIG. 13 shows a flow chart of an example method for facilitating a financial transaction with a payment account, performed in accordance with some embodiments;

FIG. 14 shows a flow chart of an example method for charging an online order to a plurality of consumers, performed in accordance with some embodiments;

FIG. 15 shows an example payment account display, in accordance with some embodiments;

FIG. 16 shows a flow chart of an example method for managing a menu database, performed in accordance with some embodiments;

FIG. 17 shows an example system for providing an online orders, configured in accordance with some embodiments;

FIG. 18 shows an example merchant system, configured in accordance with some embodiments;

FIG. 19 shows an example promotional system, configured in accordance with some embodiments;

FIG. 20 shows an example schematic block diagram of circuitry configured in accordance with some embodiments discussed herein;

FIGS. 21-22 show examples of data that may be stored to facilitate operations in accordance with some example embodiments;

FIG. 23 shows example data that may be stored in a menu database in accordance with some embodiments; and FIG. 24 shows a flow chart of an example method for providing an online order in connection with a table waitlist, performed in accordance with some embodiments.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Embodiments discussed herein may be configured to enable a shop to receive advance online orders in a manner that, from the merchant's perspective, is seamless to and integrated with the merchant's POS system. In this regard, some embodiments may free the merchant from needing a separate printer and/or facsimile machine to receive online orders. By removing the fax machine/email system dedicated online orders, the risk of online orders being lost or mixed-up (a problem that may be more of an issue when only a partial order is placed in advance) can be reduced. For example, a consumer may want to have their happy hour drinks and appetizers waiting at his table upon his arrival and use embodiments described herein to advance order only those items online. Once at his table, the consumer may then want to add dinner and/or dessert to his order. Because the advance online order was automatically entered into the merchant's POS system, it is easy for the merchant's staff to add dinner and dessert to it. As discussed below, a table identifier (e.g., where the consumer is assigned to physically sit) and/or other identifier may be associated with the online order and be likewise associated with the in-shop order, thereby marrying the online and in-shop orders together seamlessly (from the consumer's and merchant's perspectives).

While adding to an order may not be a major problem currently experienced by existing online ordering systems that are intended for (or limited to) receiving an entire order, new, currently un-experienced problems may materialize and embodiments discussed herein seek to be proactive in solving some yet-to-be-experienced problems that may develop absent the embodiments discussed herein. For example, faxing/emailing partial orders could be a logistical problem for at least some restaurants (such as those do not let tabs be transferred from the bar area to the dining area). Hence, an integrated system that enables order ahead functionality to be married with POS functionality can help solve such problems before they are even experienced by the merchant.

Another advantage that may be realized by some embodiments discussed herein includes a single menu database that can be configured to be used to generate the displays used by both consumers and the merchants' wait staff (servers/bartenders/etc.). Using a single menu database can make the initial build and subsequent updates to the online ordering system easier for merchants (or whoever maintains their POS systems). Also, despite pulling from a single menu database, controls may be provided to the merchant to enable the customization of what a consumer sees separate from what the wait staff sees. For example, a consumer may be given the option to order a Maker's Manhattan, whereas the wait staff would select Maker's Mark and then modify it as Manhattan-style martini.

Other advantages that may be realized by some embodiments discussed herein are related to expanding merchants' ability to manage inventory and have more accurate predictive ordering, consumers' ability to avoid the "check-dance," the ability to provide consumers a more personalized experience and additional deal offers, and advanced bill-dividing functionality (with or without auto-checkout).

FIGS. 1-7 show example displays 100-700 that may be presented by one or more display screens of one or more machines, sometimes referred to herein as "merchant devices," in accordance with some embodiments discussed herein. For example, the displays of FIGS. 1-7 may be presented to a merchant by a mobile device and/or a stationary device. Example mobile devices may include a cell phone, smart phone, mobile phone, laptop, tablet, iPhone, iPad, or the like. Additionally or alternatively, a merchant may access display 100-700 via a stationary device, such as a desktop computer, work station, checkout or POS device.

It will be appreciated that any number of staff members employed by a merchant may have access to merchant systems, and, as such, the term "merchant" will be used herein to describe any user representing the merchant. The displays of FIGS. 1-7 are examples of graphical user interfaces that may be provided to aid in POS and management functionalities, such as the configuring and maintaining of a menu database of menu items.

Similar to a merchant device, as described above, a machine used by a consumer may be referred to herein as a "consumer device" and may be a personal computer (e.g., desktop computer) and/or mobile device (e.g., tablet computer, laptop computer, cellular telephone, etc.), among other things. FIGS. 9 and 15 show example displays 900 and 1500 that may be presented by one or more display screens of one or more consumer devices. Examples of merchant devices and consumer devices are discussed in connection with FIGS. 17 and 18.

Furthermore, displays 100-700, 900 and 1500 may be accessed via an application that executes locally and causes a merchant device and/or consumer device to be configured to function as a specialized machine. Additionally or alternatively, cloud-based, multi-tenant, thin-client, and/or other types online service techniques may be used. For example, the displays may be provided by one or more applications that execute on a remote device, such as a server. User input information may be generated by and sent from the merchant/consumer device to the remote device, while visual and/or audio information is sent from the remote device to the merchant device.

Figure 1:
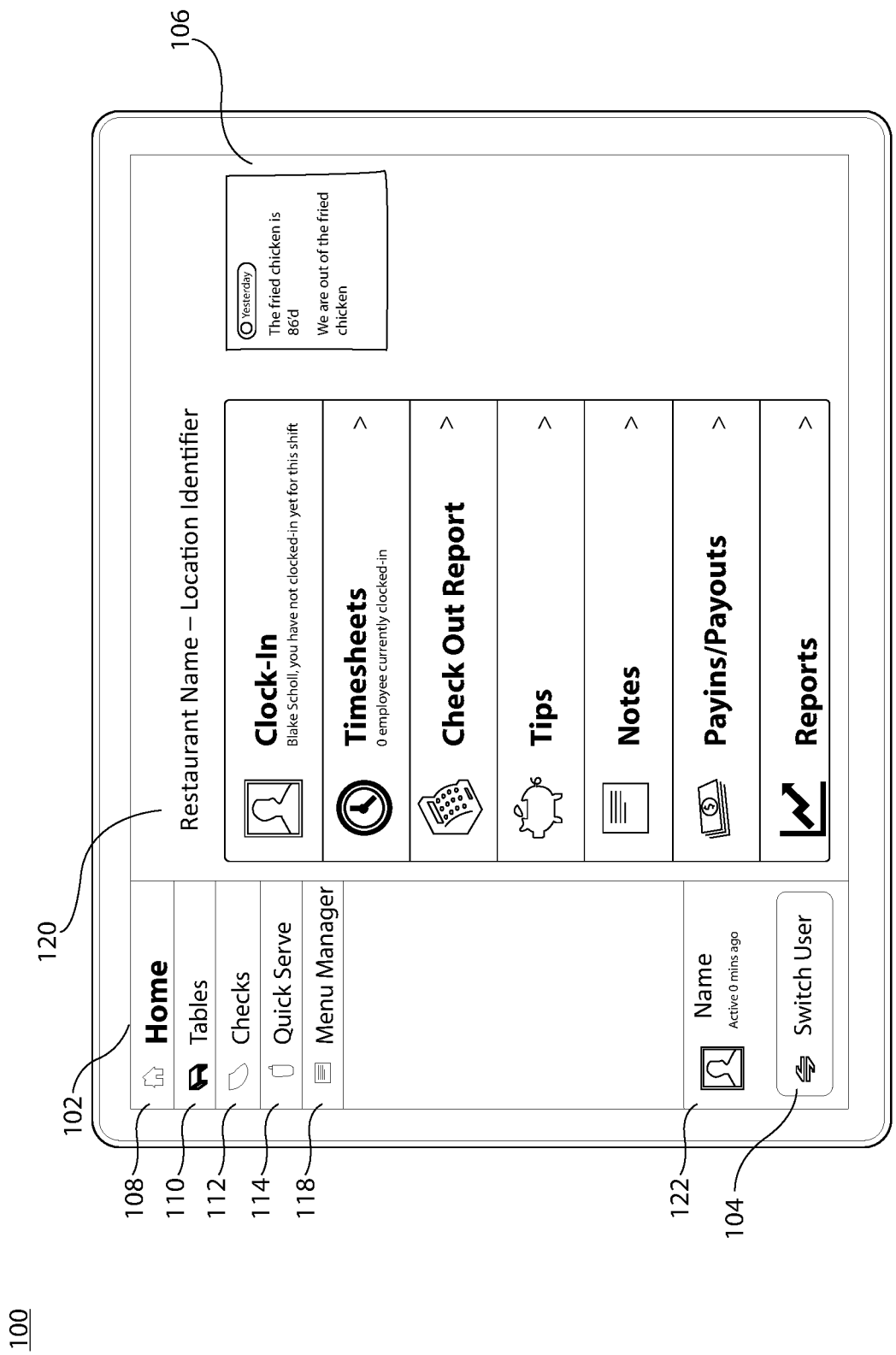

The display of FIG. 1, namely POS main display 100, is an example graphical user interface that may be displayed by/to a merchant device (e.g., POS devices 1806A-1806N shown in FIG. 18). POS main display 100 may be configured to help the merchant, such as a member of the wait staff, a server or a cashier, perform POS services at a restaurant. Additionally or alternatively, POS main display 100 may be configured to help a merchant (e.g., a manager, supervisor, technician, owner or designated employee) manage a menu database (e.g., menu database 1802 shown in FIG. 18) for the restaurant.

As shown in POS main display 100, a merchant, whose identity may be shown in merchant identification display 122, may access a selection menu 102. In some embodiments, POS main display 100 may be tailored to a particular employee and/or to the role of the employee within a merchant organization. For example, the merchant may be a manager at a restaurant. As such, upon the merchant's logging in or otherwise providing an identification for access to POS main display 100, notification display 106 may include a message indicating that the restaurant is out of fried chicken (e.g., lacks sufficient inventory) and/or that fried chicken is no longer on the menu or should not be served. A logged in merchant may also select switch user selection 104.

A displayed selection may be selected using any suitable approach, such as by contacting a touch screen, speaking, pressing a key, guiding a cursor, or any other user input technique. Upon selecting switch user selection 104, a login display (not shown to avoid unnecessarily overcomplicating the drawings) may be provided that prompts the merchant for identification and/or authentication information, such as for access to POS main display 100.

Returning to FIG. 1, the merchant may select an option from selection menu 102. For example, the merchant may select home selection 108, tables selection 110, checks selection 112, quick serve selection 114 or menu manager selection 118. Upon selecting home selection 108, home display 120 may populate allowing the merchant to clock-in/clock-out and/or perform other administrative tasks, such viewing timesheets or financial records.

Figure 2:
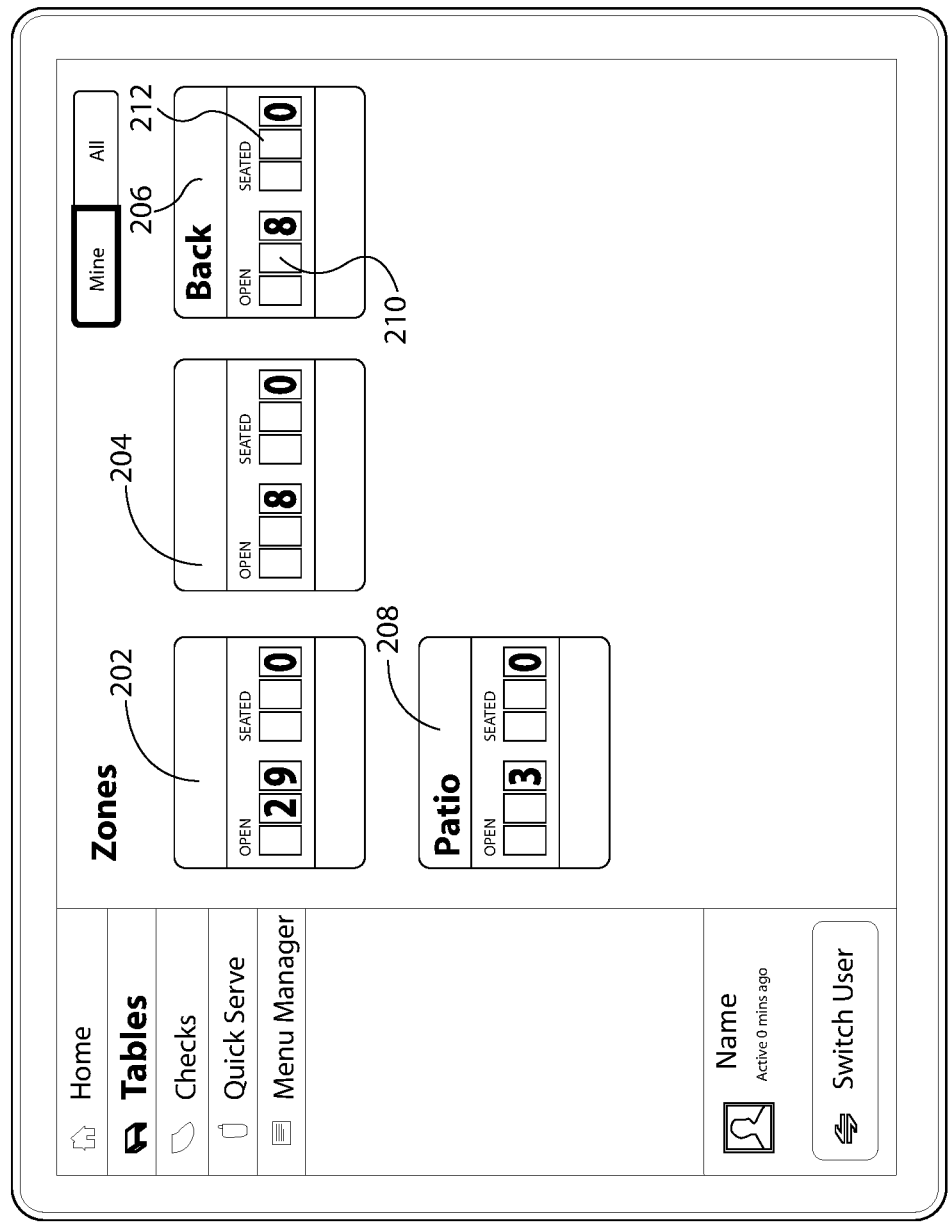
Figure 3:
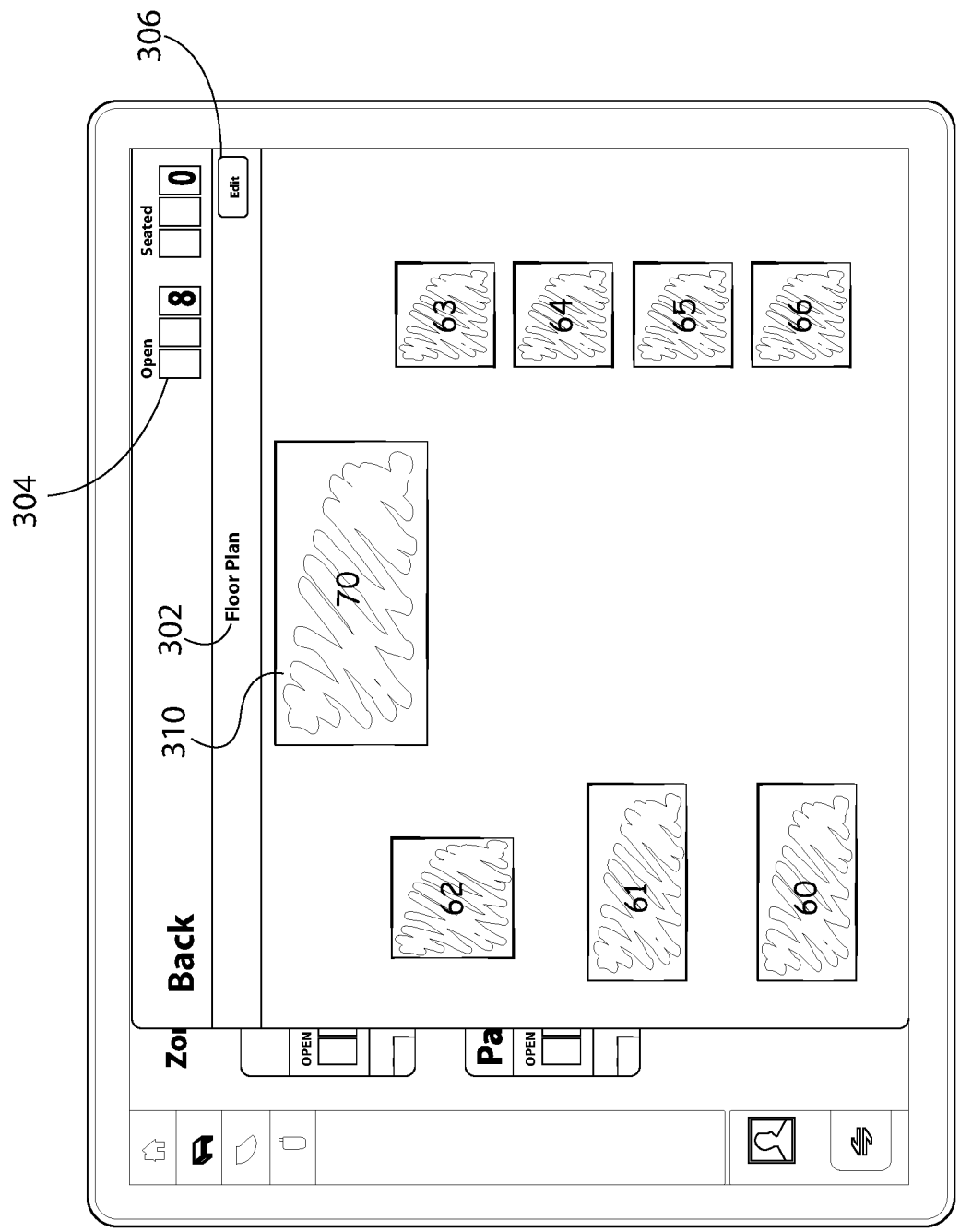

Upon selecting tables selection 110, main zone display 200 as shown in FIG. 2 may be presented. Main zone display 200 may be configured to indicate the number of open tables (e.g., at 210) and seated tables (e.g., at 212) at various zones of the restaurant (e.g., zones associated with zone selections 202, 204, 206 and 208). Upon selection of a zone selection 202-208, the merchant may be presented with a zone display. For example, upon selecting zone selection 206 (e.g., the zone associated with seating at the back of the restaurant or the "back zone," as used herein), zone display 300 as shown in FIG. 3 may be displayed to provide a floor plan 302 of tables in the back zone. Floor plan 302 may further include an indication of open tables and seated tables in the back zone at 304. In some embodiments, a merchant may edit floor plan 302 by selecting floor plan edit selection 306. As such, zone display 300 may be configured to allow the merchant to change the layout of tables, the size and orientation of tables, the number of tables, the table number associated with each table, the number of customers that may be seated at each table, or the like.

Via selection of a zone selection 202-208, a merchant may initiate a process for creating an order. For example, a merchant may carry a mobile device, such as a tablet, to a table and select the appropriate zone selection 202-208. In another example, a merchant may take an order, such via telephone or in-person, and assign the order to a table by selecting an appropriate zone selection 202-208. Additionally or alternatively, a merchant may modify an existing order that has been previously associated with a table, including but not limited to updating menu items, table assignments, payment information, etc.

Figure 4:
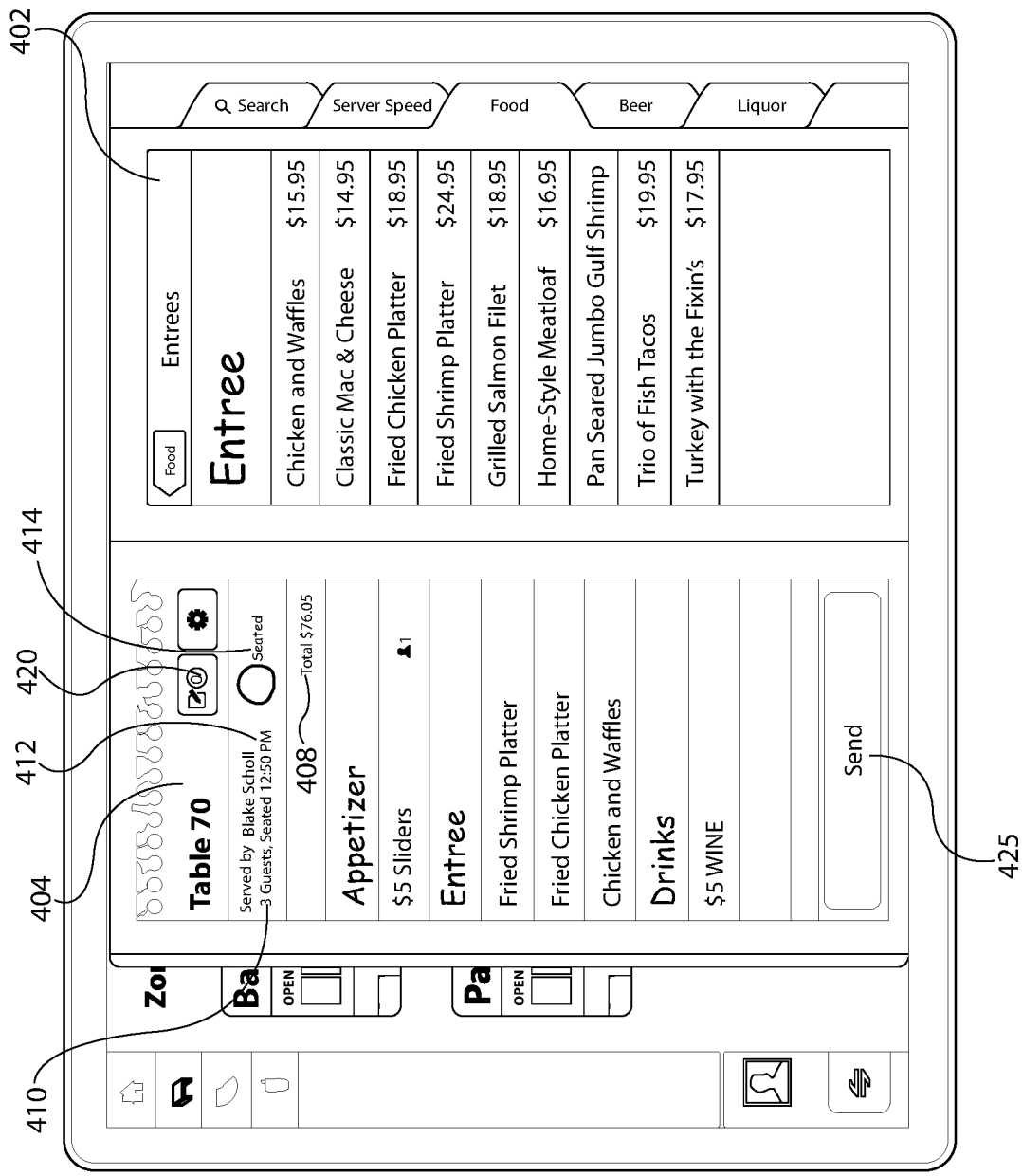

In some embodiments, the merchant may select table 70 by selecting at 310 in floor plan 302. Responsive to the selection, table order display 400, as shown in FIG. 4, may be provided. Table order display 400 may include POS menu 402 and checkout form 404. The merchant may navigate POS menu 402, which may include a selectable display of menu items. One or more selected menu items may populate on checkout form 404. A transaction price for selected menu items may be shown at 408. The number of guests associated with the order may be shown at 410. Furthermore, the status of the order and/or table may be shown at 412 and 414 (e.g., a time for a reservation, whether guests are seated, a time when the guests are seated, or the like).

When the order is complete, such as when checkout form 404 has been completed in accordance with consumer instructions, the merchant may send kitchen data to a kitchen system, such as kitchen system 1808 shown in FIG. 18, by selecting send selection 425. The kitchen data may be configured to indicate to kitchen employees that they should begin preparation one or more menu items associated with the order. For example, the kitchen data may be sent to a ticket printer (e.g., ticket printer 1814) instructing the ticket printer to print out a ticket that is viewable by the kitchen employees. Alternatively or additionally, the kitchen data may be sent to one or more electronic display devices (e.g., display device 1816) that are viewable by the kitchen employees.

Returning to FIG. 2, a merchant may initiate a process for creating a reservation via selection of a zone selection 202-208. For example, a merchant may take a reservation, such via telephone or in person, and assign the reservation to a table by selecting the appropriate zone selection 202-208. The table assignment may be based on stored information regarding reservations (e.g., as stored in order database 1812) such that two parties are not assigned to the same table at the same time. In an example process, the merchant may select zone selection 206, then table 70 at 310 in floor plan 302 of zone display 300 shown in FIG. 3, then reservation selection 420 of table order display 400 as shown in FIG. 4. Additionally and/or alternatively, the merchant may also associate an order with the reservation, such as by selecting menu items from POS menu 402. In some embodiments, the merchant may store data associated with the reservation and/or order by selecting send selection 425. Similar techniques may be used to schedule an order for delivery or take out. An example reservation system is discussed in commonly-assigned U.S. patent application Ser. No. 13/631,313, titled "SCHEDULING APPOINTMENTS WITH DEAL OFFERS," which is hereby incorporated by reference in its entirety.

Figure 5:
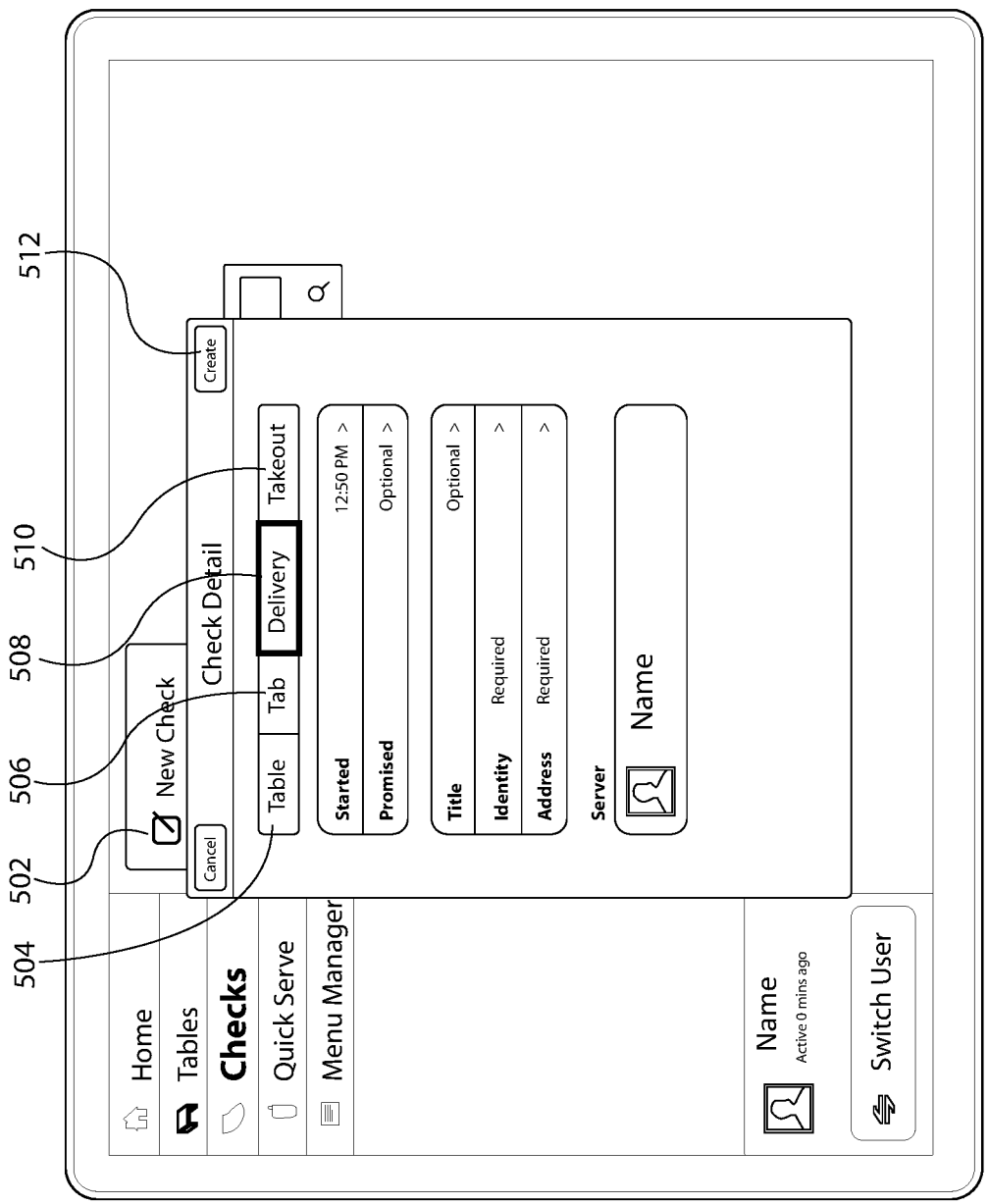

FIG. 5 shows an example check display 500, in accordance with some embodiments. The check display 500 allows a merchant to generate any type of order and/or an associated check. Returning to FIG. 1, a merchant may select checks selection 112 of POS main display 100, which may bring up a check menu configured to allow a merchant to create a new check and/or view a listing of checks (not shown to avoid unnecessarily complicating the drawings) that are associated with existing orders. The listing of checks may include a selectable list of checks each associated with a stored order.

Upon creating a new check (such as by selecting new check selection 502 shown in FIG. 5) or selecting particular check from the listing of checks, check display 500 may be displayed. The merchant may view and/or alter the order via check display 500. For example, the merchant may change the table (or reservation time) associated with a check via table selection 504, add or remove items from the tab and/or change payment methods via tab selection 506, view and update delivery information via delivery selection 508, or view and update takeout information via takeout selection 510. Furthermore, upon completion of the order, the merchant may select create check selection 512, which may result in storage of a new check or modifications to a selected check from the listing of checks. Additionally or alternatively, the merchant may send check data to a check printer or tab printer, which or may not be the same device as the ticket printer 1814 shown in FIG. 18.

Figure 6:
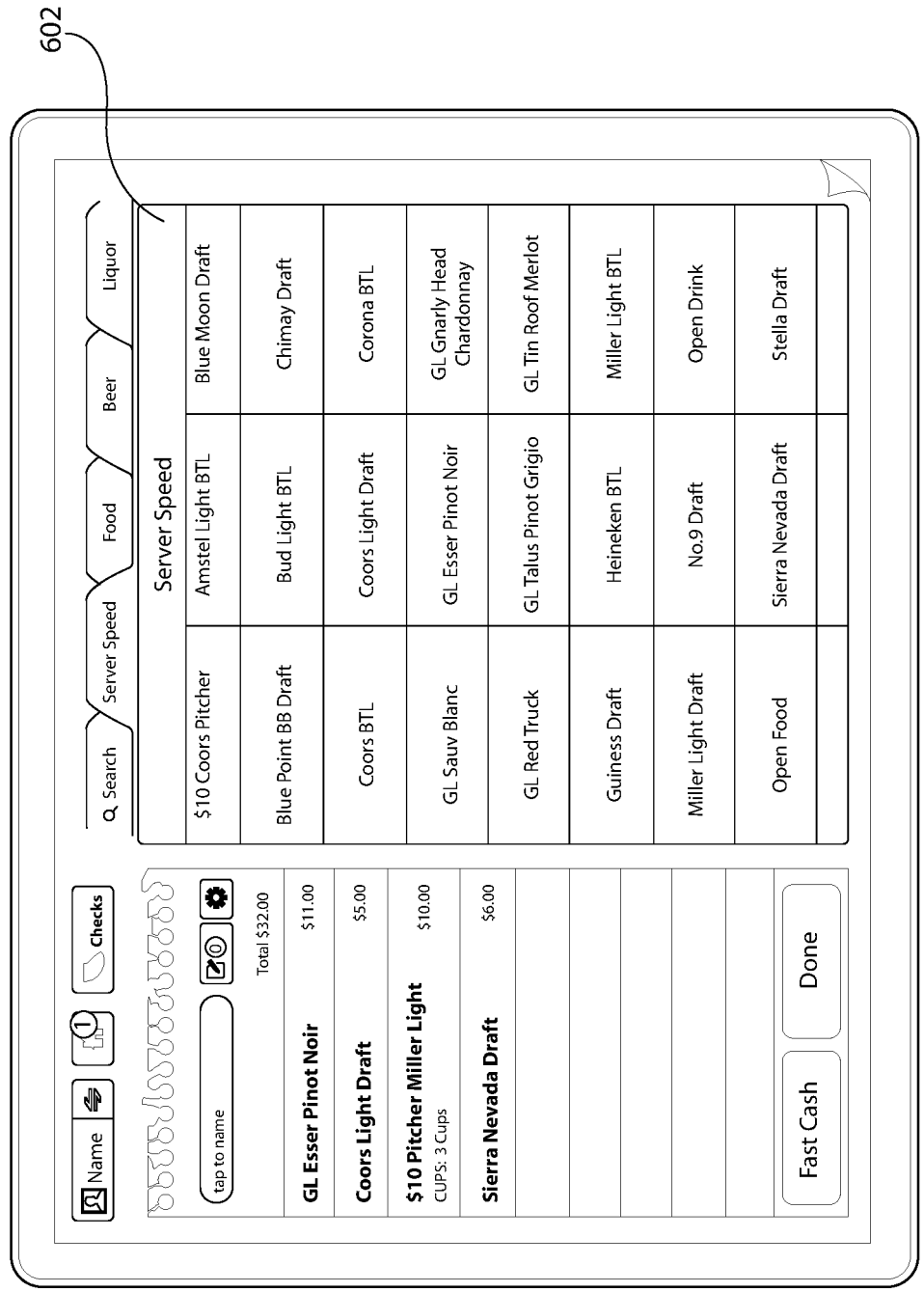

FIG. 6 shows an example quick serve display 600, in accordance with some embodiments. The merchant may access quick serve display 600 via quick serve selection 114 of POS main display 100 shown in FIG. 1. Quick serve display 600 provides a streamlined process for generating an order by a merchant. For example, quick serve display 600 may be used for orders without assigned seating and/or reservations (e.g., a fast food restaurant or a bar). Therefore, the merchant may expedite service by not having to enter a particular table number, guest number, reservation time, and/or other service-related information while generating a quick serve order.

In some embodiments, an order that is generated by a merchant device may be sent and/or stored in one or more servers, such as order server 1810 and/or order server 1908, shown in FIGS. 18 and 19, respectively. As used herein, a "restaurant device" may refer to a merchant device (e.g., a POS device) that is located within a restaurant and configured to facilitate in-restaurant ordering. In that sense, the one or more servers may be configured to receive, from the restaurant device, in-restaurant order data. As will be discussed in greater detail below with respect to method 1200, the in-restaurant order data may include menu items (e.g., from an online menu or the POS menu) that are to be added to an online order.

Figure 7:
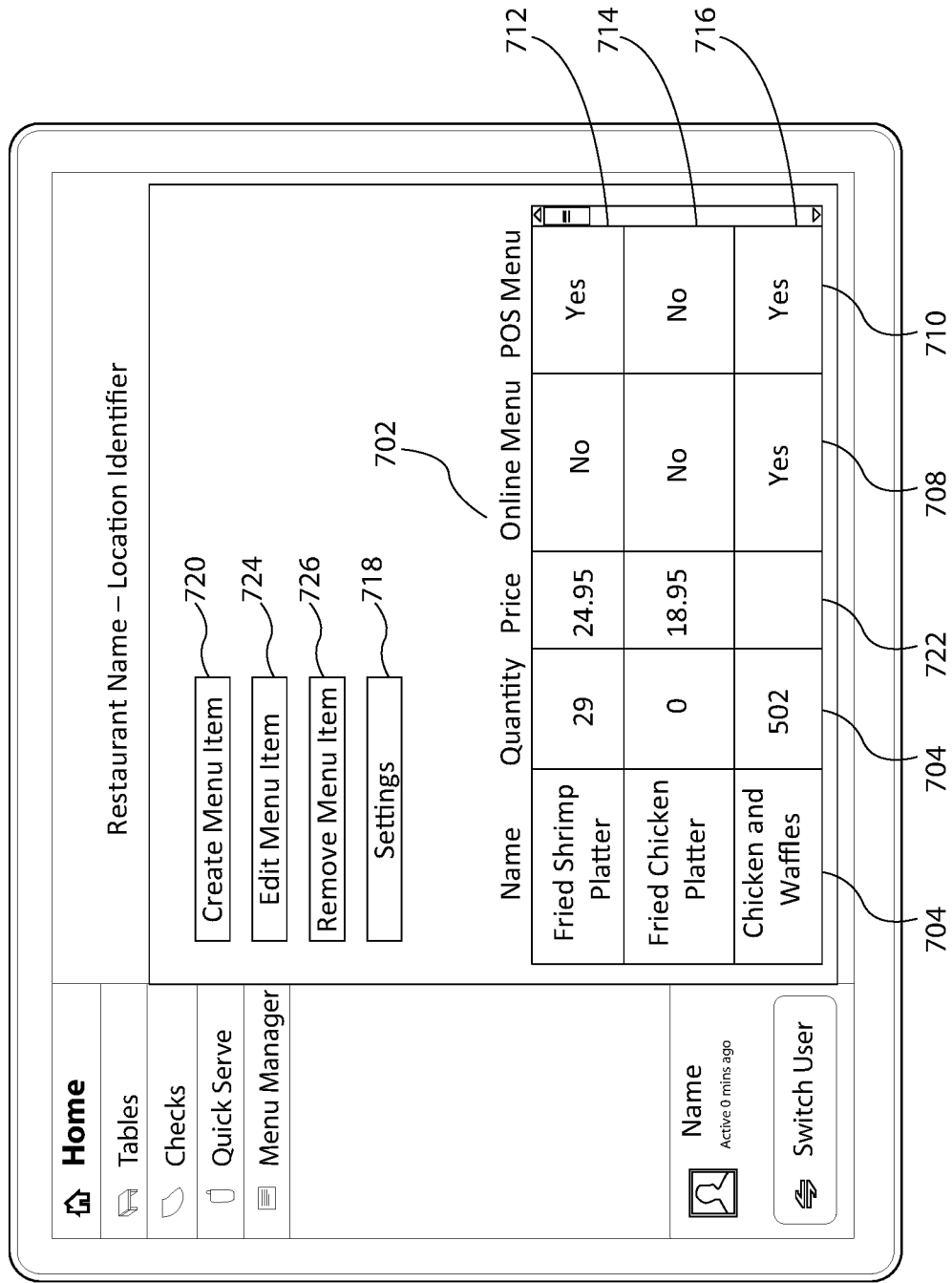

FIG. 7 shows an example menu manager display 700, configured in accordance with some embodiments. Menu manager display 700 may be configured to allow a merchant to build and/or manage a menu database (e.g., menu database 1802 shown in FIG. 18). As such, menu manager display 700 may include an inventory display 702. In some embodiments, access to menu manager display 700 may be based on the role and/or identity of the merchant. For example, a manager or owner may have access to menu manager display 700 while a waiter or waitress may not. In some embodiments, menu manager selection 118, as shown in FIG. 1, is only visually displayed in POS main display 100 for qualifying merchants of the restaurant via a POS device. Additionally and/or alternatively, menu manager display 700 (or a similar online interface) may be accessed via a merchant device without POS functionality, such as a laptop, desktop, workstation, tablet, smartphone, etc.

In some embodiments, inventory display 702 may include a display of menu items stored in the menu database. The menu database may include one or more tables wherein rows representing menu items include column-defined properties, as shown in FIG. 22. In some examples, inventory display 702 may utilize a table format having analogous menu item properties such as: item name column 704 (e.g., corresponding with item name field 2302 shown in FIG. 23), item quantity column 706 (e.g., corresponding with item quantity field 2304), price column 722 (e.g., corresponding with price field 2306), online menu column 708 (e.g., corresponding with show in online menu field 2308), and POS menu column 710 (e.g., corresponding with show in POS menu field 2310).

Each row of inventory display 702 may be associated with a particular menu item. In that sense, inventory display 702 may provide an indication (e.g., for each menu item) of a name of the menu item, the quantity remaining of the menu item, the price of the menu item, whether the menu item is shown in an online menu (e.g., online menu 900 shown in FIG. 9), and whether the menu item is shown in a POS menu (e.g., POS menu 402 shown in FIG. 4 and/or quick serve menu 602 shown in FIG. 6).

For example, row 712 indicates that Fried Shrimp Platter has 29 servings remaining (e.g., that the restaurant can only prepare 29 more orders of Fried Shrimp Platter before its inventory for that menu item is depleted or otherwise unavailable for use), and that Fried Shrimp Platter is displayed on the POS menu, but not the online menu. Row 714 indicates that Fried Chicken has no servings remaining and that it is not displayed on the online menu or the POS menu. In another example, Row 716 indicates that Chicken and Waffles has 502 servings remaining and is displayed on both the POS and the online menu. In some embodiments (not shown to avoid unnecessarily complicating the disclosure), a separate column (and database fields) may be provided for different online menus and/or different POS menus that may be offered by the restaurant.

In some embodiments, menu manager display 700 may be configured to allow a merchant to set, enable, disable, elect, define or otherwise indicate rules for automatically updating the menu database and its data. For example, menu settings selection 718 may result in a settings display (not shown to avoid unnecessarily complicating the drawings) with which a merchant may indicate that a menu item will be taken off the online menu and/or POS menu once there is less than a defined quantity (e.g., 30, at least 30, no more than 30, and/or any other number or range of numbers) of servings remaining. Additionally and/or alternatively, the merchant may indicate that a menu item should remain included in the online menu and/or POS menu until there are no servings remaining. When a menu item quantity falls below the defined quantity, such as may occur as a result of a POS order and/or an online order, the menu database may be updated to reflect the lowered quantity of the menu item. For example, Fried Shrimp Platter may have quantity decreased from 30 to 29 after an order.

Furthermore, menu information may be generated from the menu item, such as whether the menu item is being offered on the online menu or POS menu, as shown by online menu column 708 and POS menu column 710, respectively. For example, upon Fried Shrimp Platter quantity falling below a defined quantity of 30 servings, menu information may be generated (and/or stored in the menu database) indicating that Fried Shrimp Platter is no longer being offered on the online menu, as shown in online menu column 708.

In another example, either automatically or in accordance with merchant configuration, a menu item may be taken off both the online menu and the POS menu once its quantity has decreased to a defined quantity (such as 0), as shown for Fried Chicken at row 714 of inventory display 702. Additionally or alternatively, a relevant message may be sent to a merchant, such as at notification display 106 shown in FIG. 1, indicating that Fried Chicken is no longer in stock or running low.

In some embodiments, menu manager display 700 may allow a merchant to create, update, or otherwise manage the menu database. A related flow chart of an example method 800, performed according to some embodiments is shown in FIG. 8. Method 800 begins at 802. At 804, a merchant may enter a menu item to the menu database. For example, the merchant may select create menu item selection 720 of inventory display 702 and enter a menu item and associated information (e.g., name, quantity, price, etc.).

At 806, menu information may be generated from the menu items. The menu information may include, for example, whether the created menu item is displayed on the online menu, the POS menu, neither menus, or both menus. The circuitry of the merchant device and/or one or more servers configured to perform method 800 may be configured to follow rules, such as may be configured by a merchant via settings selection 718, to automatically generate one or more pieces of menu information for the menu item.

Additionally and/or alternatively, the circuitry of the merchant device and/or one or more servers may be configured to receive menu information for each menu item at 806 when a menu item is created. The merchant may also edit an existing menu item and associated menu information. For example, the merchant may select edit menu selection 724 of inventory display 702, allowing the merchant to edit the properties of menu items in the menu database. Furthermore, the merchant may remove an existing menu item from the menu database, such as by selecting remove menu item selection 726 of inventory display 702.

At 808, the generated menu information may be stored in the menu database. At 810, a determination may be made as to whether the merchant wants to enter another menu item to the menu database. If the merchant indicates a desire to enter another menu item, method 800 may return to 804. If the merchant does not indicate a desire to enter another menu item, method 800 may proceed to 812.

At 812, POS functionality may be facilitated using the menu database. For example, the menu database may be configured to send its data, such as menu information, to the merchant device. As discussed above, each menu item may be stored in the menu database with an indication regarding whether the menu item is to be displayed on one or more POS menus (e.g., POS menu 402 shown in FIG. 4 and/or quick serve menu 602 shown in FIG. 6). As such, POS menus may be generated and updated (e.g., at defined update times or in accordance with real-time menu database updates) based on data stored in the menu database.

At 814, an online menu may be generated using the menu information in the menu database. FIG. 9 shows an example of an online menu display 900, configured in accordance with some embodiments. In some embodiments, online menu display 900 may be generated by one or more servers (e.g., order server 1810 or 1908 shown in FIGS. 18 and 19, respectively) and provided to a consumer device. In this regard, a consumer may access online menu display 900 to place an online order, a reservation and/or a reservation with an associated online order. The consumer device may access online menu display 900 from any location in which there is internet access, including remotely from the restaurant and/or or from inside the restaurant. Additionally and/or alternatively, the consumer device may be running an application and/or otherwise be configured to provide the online menu and/or other displays discussed herein in the absence of a network connection (e.g., based on a pre-loaded application). For example, a consumer may be able to download the online menu 900 and view it later when offline.

As shown in FIG. 9, online menu display 900 may include online listing of menu items 902 that includes menu items (e.g., item names and prices) from the menu database. In some embodiments, online menu 900 may include only menu items that are to be shown online, as indicated by the menu database in online menu field 2308 as shown in FIG. 23.

In some embodiments, online menu display 900 may be generated and/or updated (e.g., at defined update times or in real-time menu with menu database updates) based data stored in the menu database. Thus, an update to the menu database as discussed in FIG. 16 in connection with method 1600, may be reflected in one or more POS menus and/or online menu display 900. Despite pulling from a single menu database, some embodiments may allow the merchant customize of what a consumer sees separate from what the wait staff sees. For example, a consumer may be given the option to order a Maker's Manhattan via online menu display 900, whereas the wait staff may select Maker's Mark and then modify it as Manhattan-style martini via POS menu 402 and/or quick serve display 600.

In some embodiments, online listing of menu items 902 may be populated with menu items based on automated optimization. For example, the type and quantity of menu items that are ordered via online menu display 900 may be tracked (e.g., stored as menu information in the menu database). As such, the menu items that are most likely to be ordered online may be presented more prominently (e.g., at the top) of online listing of menu items 902. Additionally and/or alternatively, only a subset of menu items from all of the menu items stored in the menu database may be presented via online listing of menu items 902 based on automated optimization.

Returning to method 800 shown in FIG. 8, the online menu generated at 814 may be provided to a consumer device at 816. The online menu may be provided to the consumer device when the consumer device is at virtually any location with online access. In some embodiments, a presence-based menu may be provided to the consumer device upon entering the merchant shop. The presence-based menu may be provided via the Internet (e.g., with location tracking to determine consumer presence) and/or via a proximity-based connection (e.g., a personal area network) with the merchant device. Presence-based interactions between consumer devices and merchant devices, applicable to some embodiments, are discussed in greater detail in U.S. Provisional Patent Application No. 61/715,230, titled "CONSUMER PRESENCE BASED DEAL OFFERS," which is hereby incorporated by reference in its entirety.

In some embodiments, the presence-based menu may be different from the online menu such that what is provided to the consumer device may differ depending on whether the consumer is at the merchant shop or not. For example, the presence-based menu provided at the merchant shop may include a full menu, while the online menu may include a subset of menu items that are suitable for takeout or to-go orders. In some embodiments, the presence-based menu may be generated using techniques similar to those described above for the online menu. For example, the presence-based menu may be generated based on menu information in the menu database. Furthermore, the merchant and/or promotional system may be allowed to select (e.g., either manually or programmatically) which menu items appear on the presence-based menu and/or the online menu, whether to disable/enable a menu, and/or otherwise manage the menus. In some embodiments, the consumer device may also be configured to allow the consumer to select between the online menu and the presence-based menu (e.g., whether the consumer is at the merchant shop or otherwise). The discussion herein regarding the online menu may be also applicable to the presence-based menu in various embodiments, and is not repeated with respect to the presence-based menu to avoid unnecessarily overcomplicating the disclosure. Method 800 may then end at 818.

FIG. 10 shows a flow chart illustrating an example method 1000 for providing online ordering with an online menu, performed in accordance with some embodiments. As such, FIG. 10 is discussed with reference to example online menu display 900 shown in FIG. 9. Method 1000 may be performed by a merchant device with access to the menu database (e.g., order server 1810 and/or POS devices 1806A-1806N shown in FIG. 18) or one or more servers capable of accessing the menu database (e.g., order server 1908 and/or promotional server 1706 or 1910), sending information stored in the menu database to a consumer device, and receiving online order information from the consumer device.

Method 1000 may begin at 1002 and proceed to 1004, where an online menu, such as online menu display 900, may be provided to a consumer device. At 1006, a determination may be made as to whether the consumer device is associated with a payment account (or other type of user profile). "Payment account," as used herein, may refer to an association of a consumer with a method of payment. In that sense, example payment accounts may include a merchant managed account, a social networking account, online payment account, a promotional account (e.g., a promotional provider account that may include a user profile with a linked financial payment account), an online user account, email account, or the like. Such accounts may be further associated with a financial payment account, such as a credit account, a checking account, a debit account, a savings account, a bank account, or the like. In some embodiments, a "payment account" may refer to any type of account that may be used in a financial transaction.

If it is determined at 1006 that the consumer device is not associated with a payment account (e.g., a consumer has not provided identification and/or authentication information for login via a payment account), the consumer may be prompted with option to provide a payment account at 1008. Alternatively and/or additionally, the consumer (e.g., a new user) may be prompted with an option to create a payment account at 1008. In some embodiments, the consumer may be given selectable options for signing in with and/or creating a preferred payment account type.

At 1010, a determination may be made regarding whether the consumer has provided payment account information. In some embodiments, the determination may include sending the payment account information provided by the consumer to one or more servers for identification and/or authentication (e.g., promotional server 1706 or 3rd party systems 1714A-1714N shown in FIG. 17).

If the user has successfully provided payment account information, method 800 may proceed to 1012, where information associated with the payment account (e.g., name, address, contact information, payment information, credit card information, deal voucher information, profile information, or the like) may be stored (e.g., in POS system 1806, promotional database 1704, 3rd party systems 1714A-1714N, POS system 1806).

If the consumer fails to successfully provide payment account information at 1010, method 800 may proceed to 1020 (discussed in further detail below), where an online order may be received with the consumer. As such, some embodiments may allow the consumer to provide a payment account any time after the online order is received at 1020. For example, whether located at the restaurant or remote from the restaurant, the consumer may enter a payment account with payment account display 1500 (e.g., after the consumer selects complete order selection 916 of online menu display 900) via the consumer device. Additionally and/or alternatively, the consumer may provide an alternative form of payment (e.g., as discussed at 1308 of method 300) via payment account display 1500 and/or to the merchant.

Returning to 1006, if it is determined that the consumer device is associated with a payment account, method 1000 may proceed to 1012, where any additional information provided by the consumer may be stored.

At 1014, order history associated with the payment account may be retrieved, as discussed below in method 1100. At 1016, a determination may be performed as to whether to make order suggestions to the consumer. For example, the merchant device may be configured such that the merchant may enable or disable the making of order suggestions.

If it is determined that order suggestions will be provided, method 1000 may proceed to 1018. At 1018, order suggestions may be generated and provided based on the order history, such as to the consumer device, as discussed below in method 1100.

FIG. 11 shows an example of a method 1100 for generating and/or providing order suggestions, performed in accordance with some embodiments. As such, method 1100 may be performed at 1018 of method 1000 after it is determined at 1016 to make order suggestions to the consumer. Method 1100 may begin at 1102 and proceed to 1104, where order history associated with a consumer and/or payment account is retrieved.

In some embodiments, an order history from the restaurant that is associated with the payment account may be retrieved at 1102. Alternatively and/or additionally, an order history from one or more other restaurants that is associated with the payment account may be retrieved. As such, a payment account may be specific to a restaurant (e.g., a patron account) or may be used in conjunction with a plurality of restaurants (e.g., a credit card account, an online payment account, a promotional system account, etc.). Where a payment account is shared, a restaurant may determine whether to share its order history with other restaurants (including whether to share free of charge or for a fee) and/or whether to retrieve order histories from other restaurants at 1102. Thus, retrieving order history may include sending and/or receiving data from another merchant system, a third party system, or a promotional system.

At 1106, one or more available deal vouchers may be retrieved. In some embodiments, retrieving available deal vouchers may include communicating with a promotional system, such as promotional system 1702 shown in FIG. 1700. In another example, a restaurant may generate and provide its own offering of deal vouchers that may be purchased by the consumer.

At 1108, one or more unused deal vouchers that has been purchased by the consumer associated with the payment account may be retrieved. For example, the payment account may be a promotional account (or associated with a promotional account) that allows a consumer to purchase deal vouchers based on promotional offerings for discounted products and/or services by merchants. For example, the consumer may have previously purchased a deal voucher with the payment account but has not yet redeemed the purchased deal voucher. In some embodiments, deal vouchers that may be used at the restaurant, that have not expired, and/or that have not been redeemed may be retrieved at 1108 (e.g., from promotional system 1702).

At 1110, online social network information may be retrieved. An "online social network," as used herein, may refer to an online service, platform, or internet site that is configured to facilitate the building of social connections for its account holders. A user may create a profile and share preference information such as interests, hobbies, likes, dislikes, etc. via the internet. Furthermore, the user may create an association with other users, such as by sending "friend requests" and/or responding to friend requests. In some embodiments, the payment account may be a social networking account (e.g., Facebook, Twitter, LinkedIn, or the like). Virtually any type of payment account may include social networking capabilities. As such, retrieving online social network information at 1110 may be performed by communicating with promotional system 1702, one or more 3rd party systems 1714A-1714N, or the like. In some embodiments, a user's preferences stored in the profile may be retrieved at 1110. Furthermore, preferences of friends and/or family of the consumer, as well as their order histories, may also be retrieved at 1110.

At 1112, one or more suggested menu items may be generated based on some or all of the data retrieved at 1104-1110. For example, if the consumer has ordered certain dishes at the restaurant and/or at one or more other restaurants, a menu item suggestion may be generated based on such orders. In another example, a suggestion may be generated based on the fact the consumer has never tried a particular menu item. How recommendations are made may be consumer/merchant configurable and/or restricted in any suitable manner (e.g., opt-in required by consumer and/or merchant, limited to one restaurant, limited to one type of restaurant, open to a group of restaurants, etc.). Method 1100 may end at 1114.

Returning to FIG. 10, the one or more suggested menu items (as may be determined at 1112 of method 1100) may be provided to the consumer device at 1018, an example of which is shown at 922 of online menu display 900 in FIG. 9. As discussed above, a suggested item may be associated with a deal voucher that the consumer may be given an option to purchase and/or redeem. As such, some embodiments of online menu display 900 may allow a user to purchase a deal voucher or to redeem a purchased deal voucher for the suggested menu item.

If it is determined at 1016 not to make order suggestions to the consumer or if the one or more suggested menu items are provided to the consumer at 1018, method 1000 may proceed to 1022, where an online order may be received from the consumer. For example, a consumer may select order selection 904 of online menu display 900. Responsive to the selection, online listing of menu items 902 may be presented. A user may add a menu item to an online order by setting a quantity, such as at 906, and then selecting add to order selection 908. Menu items that have been added to the order may be displayed with any relevant information, such as at online cart display 910. Furthermore, the consumer may attach comments to the online order (e.g., indicating a preference for a rare Salmon Fillet) via add comment selection 912. The user may also remove a menu item from online cart display 910 by selecting remove item selection 914. The consumer may select complete order selection 916 to indicate that the menu item entries in online cart display 910 are complete.

In some embodiments, order options may be received with the online order at 1020. Example order options may include whether the order is for dine-in, takeout or delivery. With reference to online menu 900 shown in FIG. 9, the consumer may select dine-in selection 916, takeout selection 918 or delivery selection 920. The consumer may further be prompted for additional information regarding a selected order option. For a takeout selection, for example, the consumer may be asked for a pickup time. For a delivery selection, the consumer may enter a delivery time and location. For a dine-in selection, the consumer may be prompted for a reservation time, the number of guests, seating preferences, table preferences, or virtually any other information that may be useful in providing a dine-in option to the consumer.

As discussed above, some embodiments may provide for a presence-based menu when the consumer is at the merchant shop. As such, the consumer device may be configured add menu items to a presence-based order via the consumer device at the merchant shop. Method 1000 may end at 1022.

FIG. 12 shows an example of a method 1200 for providing an online order (e.g., as received by ordering system 1804 shown in FIG. 18) to a POS system (e.g., POS system 1806). For example, online order information received from the consumer device may be sent to a POS device (e.g., POS devices 1806A-1806N). As discussed above with reference to displays 100-700, the POS device may be configured to facilitate POS orders at the restaurant. In some embodiments, similar techniques may be used to facilitate online orders received by the ordering system.

In some embodiments, one or more servers, such as order server 1810 and/or order server 1908, may be configured to perform method 1200. Additionally and/or alternatively, any other device (e.g., promotional server 1706, merchant systems 1710A-1710N, a merchant device, and 3rd party systems 1714A-1714N) capable of communicating with the consumer device and the POS device may be configured to perform method 1200.

Method 1200 may begin at 1202 and proceed to 1204, where an online order may be received from a consumer device. For example, online order data may be generated by a consumer device with online menu display 900, as discussed above at 1020 of method 1000. In some embodiments, a presence-based order including presence-based order data may be received from the consumer device instead of and/or in addition to the online order data. Method 1200 is described with reference to an online order, but may also be applicable to a presence-based order.

At 1206, a trigger condition to begin preparation of the online order may be determined. The trigger condition may be based on one or more factors including time-based factors, event-based factors, and/or one or more condition-based factors. For example, the trigger condition may be based on a reservation time, such that food preparation may begin near the reservation time. In another example, a user's location may be used such food preparation may begin when the user (or a location-tracked consumer device) is within a certain proximity to the restaurant. Furthermore, characteristics of the online order may factor into the determination. For example, an order including a large number of menu items may require a greater buffer time for food preparation. Similarly, certain menu items may require greater preparation times than others. Via the use of trigger conditions, a first course may be prepared and waiting for the consumer at the consumer's table when the consumer is seated, in accordance with some example embodiments.

At 1208, POS data associated with the online order may be sent to the POS device. The POS data may indicate, for example, the menu items in the online order. It may also indicate order options including dine-in time, delivery time, pickup time, reservation time, a trigger condition to begin food preparation, among other things. Furthermore, POS data may indicate payment options, such as one or more payment accounts, as discussed in further detail below in connection with FIGS. 13-15.

In some embodiments, the POS data may be configured such that the online order may be received by the POS device to facilitate automated food preparation, table reservations, and/or payment. In other words, data that a merchant may enter via displays 100-700 of FIGS. 1-7, may be received as an online order, such as by order server 1810. The data may then be sent to the POS device with little or no merchant intervention. As such, there may be no need for the merchant to manually enter an online order as a POS order via the POS device.

In some embodiments, the merchant may access and update the online order via the POS device similar to how a merchant might access a stored POS order (e.g., via displays 100-700). For example, the listing of checks discussed above in connection with FIG. 5 may include a check associated with the online order. As such, the merchant may change the table or reservation time, the number of guests, add or remove menu items, view and update order information, send the check to a check printer, etc. for the online order. In another example, the merchant may access the online order that has been associated with a table via floor plan 302 of zone display 300 shown in FIG. 3.

In some embodiments, the trigger condition to begin preparation of the online order (e.g., shown at 1206 in FIG. 12) may be determined by the POS device after the POS data is received at 1208. As such, it is appreciated that the order of steps of method 1200 as indicated by flow chart arrows in FIG. 12 (as well the order of steps for other methods discussed herein) is merely exemplary and are not necessarily limiting.

At 1210, a determination may be performed as to whether the online order was canceled. Merchants may have policies as to when and/or to what extent placed order may be canceled. For example, a merchant may allow cancelation at any time, prior to menu item preparation, prior to an occurrence of a trigger condition, prior to payment, prior to a reservation time, or not at all.

The consumer may indicate a desire to cancel an online order using the same consumer device used to place the online order or a different consumer device. Upon identification and/or authentication (e.g., with a payment account or other online account), the consumer may select my orders selection 925 of online menu display 900 shown in FIG. 9. In response, the consumer may be presented with information regarding pending orders (online orders or otherwise), including reservation information, payment information, account information, etc. The consumer may also be allowed to make other modifications to the online order, such adding/subtracting menu items, changing reservation times, changing the number of guests, etc. As such, responsive to the consumer sending an indication to cancel the online order, the POS data associated with the online order may be removed (or otherwise configured to a status such that the online order is not prepared) from the POS device at 1212. In another example, the consumer may call (or otherwise contact) the restaurant and the merchant may enter the cancellation via the POS device, e.g., remove the order from the POS device. Method 1200 may then end at 1228.

If the order was not determined to be not canceled at 1210, a determination may be made as to whether one or more additional menu items have been ordered by the consumer at 1214. As discussed above, the consumer may select my orders selection 925 of online menu display 900, which may allow the user to associate additional menu items (e.g., from the with the online order. In some embodiments, techniques similar to those described above with respect to FIGS. 8-9 may be used to present an online menu to the consumer to add the additional menu items. It is appreciated that the additional menu items may be added by the consumer from virtually any location via the consumer device, such as at the restaurant after the consumer has arrived and/or at a location remote from the restaurant prior to the consumer's arrival.

At 1216, the online order may be updated to include the one or more additional menu items. The method may then return to 1208, where the one or more additional menu items may be sent to the POS device. In some embodiments, the consumer may be allowed to associate an additional item with the online order until payment. For example, even after the consumer has been seated, has received some or all of an order, and/or has completed dining, the consumer may be allowed to enter an additional item online, such as with the consumer device.

At 1218, a determination may be made as to whether an additional item has been entered by the merchant (e.g., as in-restaurant order data). For example, after the consumer has arrived at the restaurant, the consumer may directly ask the merchant to add an additional item to the order. The merchant may enter the additional item via a POS device similar to entry of a POS order, as discussed above. Additionally and/or alternatively, the consumer may otherwise contact the merchant (e.g., by phone) and request that additional menu items be added to the online order.

If no additional items are entered by the merchant, method 1200 may proceed to 1220 where preparation of the online order may begin. If an additional item is entered by the merchant, the additional items may be added to the order at 1222 (e.g., associated with a common table, group, order, online order, and/or method(s) of payment), and preparation of the additional items may begin at 1224.

As discussed above at 1206, the beginning of preparation of the online order may depend upon the satisfaction of a trigger condition. As such, preparation of the online order at 1220 may be performed separately from preparation of the additional items at 1224. For example, an additional item may be added after preparation of the online order has begun. Additionally and/or alternatively, if an additional item is entered before preparation of the online order, preparation of all items associated with the order may begin at substantially the same time.

In some embodiments, preparation of a menu item at 1220 and 1224 may include sending data indicating the menu item to a ticket printer or a display device. For example, such data may be sent upon satisfaction of a trigger condition to alert kitchen staff. A merchant system may include one or more ticket printers and/or display devices. For example, a restaurant may include separate menu item preparation areas responsible for different types of menu items (e.g., cold prep, hot prep, drink station, etc.). In some embodiments, different menu items may be sent to the appropriate ticket printer and/or display device in accordance with the preparation area of the menu items. The kitchen staff, upon reading a ticket printed by the ticket printer and/or the display device, may begin preparation of the order accordingly.

In some embodiments, the circuitry of the merchant device may be further configured to display information about a consumer that may be stored in association with a payment account (e.g., as provided by from the consumer at 1008 of method 1000) at 1220 to provide a more personalized experience to the consumer when the consumer orders ahead. For example, the merchant may know more information about a consumer who orders in advance than a consumer who just walks-in or makes a standard reservation (e.g., data in addition to name, number of people in party and time of reservation). In this regard, the merchant may know what type of table the consumer likes (booth, high top, etc.), whether the consumer prefers bottle water or tap water, etc., and this information can be leveraged when the wait staff greets the consumer and, optionally, takes the rest of the consumer's order at, e.g., 1218.

At 1226, the consumer may be charged for the order. In some embodiments, the consumer may be charged at the completion of the meal and/or after sending the online order and/or presence-based order to the merchant via the consumer device. For example and as discussed above with respect to FIG. 5, the POS device may send check data to a check printer. The check printer may print the tab, which may be presented to the consumer. In some embodiments, the consumer may pay the tab using any form of payment including cash, credit card, debit card, check etc. As discussed in greater detail below with respect to FIGS. 13-15, the consumer may alternatively and/or additionally specify payment with one or more payment accounts. Method 1200 may end at 1228.

FIG. 13 shows an example of a method 1300 for facilitating a financial transaction with a payment account, performed in accordance with some embodiments. Method 1300 allows an advanced form of payment to be associated with an order, such as the online order. In this regard, the consumer may not have to present any form of payment and/or may only have to choose the tip amount at the table. Method 1300 may be performed by a merchant device (e.g., POS devices 1806A-1806N or ordering system 1804) and/or one or more servers (e.g., servers 1810 and 1908).

Method 1300 may begin at 1302 and proceed to 1304. At 1304, a determination may be made as to whether the consumer is associated with a payment account suitable for the financial transaction. As discussed above with respect to FIG. 10, the consumer may provide payment account info at 1008 of method 1000 that may be associated with the online order. An example online display (e.g., payment account display 1500) for specifying one or more payment accounts is shown in FIG. 15.

If the consumer is determined to be associated with a suitable payment account, method 1300 may proceed to 1314, wherein it is determined whether the consumer authorized applying of charges to the payment account. For example, the consumer may be given a printed tab on which the consumer may provide a payment amount (e.g., tab amount and tip) and authorization (e.g., signature). In another example, an electronic tab may be sent to the consumer device such that the consumer may provide and/or authorize payment via the consumer device. Additionally and/or alternatively, the consumer may have preauthorized a payment amount online via one or more payment accounts, such as by accessing payment account display 1500 shown in FIG. 15.

Returning to 1304, if the consumer is not associated with a payment account and/or a payment account that may be used by the merchant, a message may be sent to the merchant device that prompts the merchant to request payment information, such as an alternative form of payment, at 1306. In that sense, the merchant may rely on notifications that may direct the merchant through the payment process when needed. "Alternative form of payment," as used herein, refers to a form of payment other than stored payment account, such as cash. At 1308, an alternative form of payment may be received. The consumer's alternative form of payment may be charged at 1310 and method 1300 may end at 1320.

Returning to 1314, if the consumer authorizes applying of charges to the payment account, method 1300 may proceed to 1316, where the payment account is charged. If the consumer has not authorized applying of the charges to the payment account, a determination may be made at 1318 regarding whether the consumer is still at the merchant. If the consumer is still at the merchant, the method may proceed to 1306-1310, where the consumer may provide an alternative form of payment.

In some embodiments, if the consumer is determined to be no longer be at the merchant at 1318, a stored and/or preauthorized payment account may be charged at 1316. As such, payment of the tab may be triggered based on the location of the consumer device. For example, as the consumer leaves the restaurant, the tab may be automatically charged with using a stored and/or preauthorized payment account. After 1316, method 1300 may end at 1320.

FIG. 14 shows an example of a method 1400 for charging an online order to a plurality of consumers, performed in accordance with some embodiments. For example, one or more consumers may associate an online order with a plurality of payment accounts. The plurality of payment accounts may be associated with a single consumer. Additionally and/or alternatively, the plurality of payment accounts may be associated with different consumers so that a tab may be shared among different payment accounts and/or alternative payment methods.

Method 1400 may begin at 1402 and proceed to 1404, wherein data associated with an online order is received. At 1406, a determination may be made as to whether to charge a plurality of consumers for the online order. In some embodiments, payment with a plurality of payment accounts may be set up by one or more consumers online, such as with a consumer device.

FIG. 15 shows an example payment account display 1500, configured in accordance with some embodiments. Payment account display 1500 may facilitate payment for an online order with one or more payment accounts (either at the time of the online order or at a later time). As such, payment account display 1500 may be accessed via a consumer device, such as consumer device 1712 shown in FIG. 17.

For example, payment account display 1500 may be shown after the consumer has selected complete order selection 916 in menu display 900, as shown in FIG. 9. A consumer may select a payment account type with dropdown box 1502, which may populate authentication box 1504. Next, the consumer may enter a payment account login and password. If the payment account is successfully authenticated, such as by an appropriate server, it may be added to payment account list 1506, as shown for Payment Account 1, 2 and 3. Additionally and/or alternatively, a payment account previously provided by the consumer, such as at 1010 of method 1000, may be added to payment account list 1506 either automatically or by the consumer.

In some embodiments, the consumer may specify an allocation of payments among a plurality of payment accounts at 1508. For example, the consumer may specify that the final tab is to be split evenly among the two or more payment amounts. Additionally and/or alternatively, the consumer may specify a ratio for allocating the payment amounts. For example, Payment Account 1 may pay 50%, Payment Account 2 may pay 20% and Payment Account 3 may pay 30%. As such, additional items that are added to the online order may be charged in accordance with the specified ratio. In some embodiments, the consumer may customize rules for allocating the payments. For example, the consumer may set limits on how much may be charged to a particular payment account and/or specify that a particular payment account will be charged for any unpaid amounts (e.g., charges resulting from additional items, non-preauthorized amounts, tips, or the like).

In some embodiments, the consumer may set a preauthorized payment. The consumer may enter a preauthorized amount at 1510, which may be charged in accordance with the allocation of payments specified at 1508. By preauthorizing a payment, the consumer may not need to be presented with a tab and/or may not need to present any method of payment. Instead, the consumer may simply leave the restaurant upon completion of the meal. The payment account(s) may be charged at any time. For example, a payment account may be charged upon the consumer selecting submit selection 1512. In other examples, the payment account may be charged upon submitting the online order, after completion of the meal at the restaurant, based on the location of the consumer device associated with the consumer, upon beginning preparation of an order at 1220 or 1224 of method 1200, etc.

In some embodiments, the consumer may also add a deal voucher as a method of payment. By entering a deal voucher, the consumer may avoid having to present a printed voucher to the merchant at the restaurant. For example, the consumer may select deal voucher selection 1516 with dropdown box 1502. The consumer may be prompted to enter identification for the deal voucher, such as an identification number that may found on a printed voucher. Additionally and/or alternatively, deal vouchers may be stored (e.g., in promotional database 1704) in association with a promotional account. For example, the consumer may select promotional provider selection 1518 with dropdown box 1502. In response, authentication box 1504 may prompt the consumer to login if required. Next, a listing of available and/or unused deal vouchers, as may be received from promotional server 106, may be presented to the consumer. In some embodiments, the listing of deal vouchers may include only deal vouchers applicable to the restaurant and/or selected menu items. The consumer may be allowed to purchase at deal voucher and/or apply a purchased deal voucher as a form of payment.

In some embodiments, upon successfully applying a deal voucher, online order total 1518 may be updated to reflect a remaining balance that does not include any payments provided via deal voucher.

Returning to method 1400 shown in FIG. 14, if it is determined at 1406 that the order is not to be charged to a plurality of consumers (e.g., as specified by the consumer via payment account display 1500), method 1400 may proceed to 1408. At 1408, the consumer may be charged for the full amount, such as by using techniques similar to those discussed above with respect to method 1300.

If it is determined at 1406 that the order is to be charged to a plurality of consumers, method 1400 may proceed to 1412. At 1421, an allocation of payment amounts among the plurality of consumers may be determined. For example, the allocation of payments may be specified by the consumer at 1508 of payment account display 1500. Additionally and/or alternatively, the consumer(s) may update an existing allocation of payments either online or through the merchant at the restaurant. In some embodiments, the allocation of payments may be updated at any time before financial transactions are executed. For example, the consumer may decide to pay for half of the order by cash upon receiving the tab, and the remaining half can be charged via a one or more payment accounts as specified online. In another example, a first consumer may pay for a portion of the tab, while the remaining portion can be charged via one or more payment accounts to other consumers, as specified online. At 1414, the plurality of consumers may be charged according to the allocation of payment amounts. Method 1400 may end at 1410.

FIG. 16 shows an example of a method 1600 for managing a menu database, performed in accordance with some embodiments. In some embodiments, method 1600 may be performed with one or more servers (e.g., menu server 1904, order server 1908, and/or one or more 3rd party systems 1714A) that provide management of the menu database (e.g., menu database 1902) as an online service to a merchant device. Alternatively and/or additionally, method 1600 may be performed by the merchant device in communication with the menu database (e.g., POS device 1806A with menu database 1802, as shown in FIG. 18).

Method 1600 may begin at 1602 and proceed to 1604. At 1604, the one or more servers or merchant device may be configured to access menu information from the menu database indicating amounts of menu items that are in stock. The menu database may be configured to support displays presented by the merchant device (e.g., a POS device) in a restaurant and an online menu accessible by a consumer device. The consumer device may be remote from the restaurant, at the restaurant, and/or anywhere with internet or network connectivity.

At 1606, one or more menu items associated with an order may be received. The order may be an online order. For example, the one or more servers may be configured to receive the menu items at any suitable time, such as after the consumer has entered the online order, after the beginning of food preparation, after the consumer has provided payment, etc. Additionally and/or alternatively, the order may be an in-restaurant order that may be entered by the merchant device (e.g., a restaurant device that is operated within the restaurant) as in-restaurant order data.

In some embodiments, menu items associated with a reservation may be received well in advance of the reservation. As such, a merchant may be able to better predict how much and what kind of inventory is needed for a given day based on the menu information in the menu database. For example, if a number of people order crab for the upcoming Friday, the merchant can order more crab and minimize the risk of running out.

At 1608, the menu information in the menu database may be updated based on the order. As discussed above, the menu database may track an item quantity associated with each menu item. Data indicating that a menu item has been ordered, prepared, or otherwise removed from inventory, may be used to change the item quantity. For example, if the consumer orders 1 serving of Salmon Fillet as shown in FIG. 9, the item quantity of Salmon Fillet in the menu database may be decreased accordingly.

At 1610, a determination may be performed as to whether the menu item is out of stock and/or otherwise unavailable for online order. For example, the quantity of Salmon Fillet may drop to 0, which may indicate that Salmon Fillet is out of stock. In another example, a menu item may be unavailable for online order once the quantity falls below a specified amount.

If the menu item is not out of stock and/or otherwise available for order, method 1600 may proceed back to 1606, where the merchant device may receive additional menu items associated with the online order or a different online order.

If at 1610 the menu item is out of stock and/or otherwise unavailable for online order, an out of stock or otherwise unavailable menu item may be removed from the online menu at 1612. When appropriate, the menu item may also be removed from the POS menu.

Furthermore, a notification may be sent to the merchant, such as via notification display 106 shown in FIG. 1. In general, the menu items included in the online menu and/or the displays presented by the POS device (e.g., POS menu 402 or quick serve display 600) may be updated in response to the menu information from the menu database being updated. Method 1600 may then end at 1614.

FIG. 24 shows an example of a method 2400 for associating an online order with a waitlist for a table at a restaurant, performed in accordance with some embodiments. For example, in addition to, or instead of, making an online reservation, the consumer may be allowed to join the waitlist for a table via the consumer device. A restaurant, for example, may not take reservations, but instead seat people on a first-come-first serve basis. Some embodiments may allow consumers to put their name on the list remotely. Additionally or alternatively, some embodiments may enable the consumer to enter an online order while waiting for a table. One or more machines, such as order server 1810 and/or order server 1908, may be configured to perform method 2400. Additionally and/or alternatively, any other device (e.g., promotional server 1706, merchant systems 1710A-1710N, a merchant device, and 3rd party systems 1714A-1714N) capable of communicating with the consumer device may also or instead be configured to perform some and/or all of method 2400.

Method 2400 may begin at 2402 and proceed to 2404, where a waitlist indicating table wait times may be accessed. For example, waitlist data may be stored in order database 1812 and/or 1906 that indicates status of each table (e.g., available, seated, reserved, seating capacity, etc.). The waitlist may be accessed online, for example, by one or more consumer devices, and a corresponding waitlist display (not shown) may be presented to the consumer.

At 2406, an entry may be added to the waitlist for a table based on a request from a consumer device and/or a merchant device. For example, a consumer device may be configured to display an interface that prompts the consumer to enter a number of guests, table preferences, and/or any other suitable waitlist data that may be useful to assign the table to the consumer (and guests if applicable). Additionally and/or alternatively, the merchant device may be configured to allow a merchant to add the one or more consumers to the waitlist for the table, such as when the consumers arrive at the restaurant and request a table from the merchant. It is appreciated that, in some embodiments, the one or more consumers may be assigned to a type of table (e.g., booth, high top, waitlist table section, bar seating, etc.) based on the waitlist data rather than a particular table. For example, a party of five consumers may be placed in the waitlist for any table that seats at least five consumers as opposed to being assigned table 42 (which may be one of the tables that seats five consumers). In other embodiments, the consumer who orders ahead may have the order automatically and/or manually (by the consumer and/or merchant) associated with a particular table. The table association may be based on the consumer's profile (e.g., a consumer may express a preference as to where to sit, such as near a window or at the back of the restaurant), the available tables for a particular time/day, the merchant's selection, and/or any other criteria.

At 2408, an estimated seating time for the waitlisted table may be sent to the consumer device. For example, the one or more servers may include circuitry configured to generate the estimated seating time for the table based on how long the table (or any other suitable table) has been occupied, the number of guests at the table, the size of the waitlist, and/or any other factors that may be useful in providing the estimated seating time. In some embodiments, the estimated seating time may be pushed to the consumer device to further provide an indication that the consumer was successfully placed in the waitlist.

At 2410, a determination may be performed regarding whether an online order has been received. For example, the consumer may enter the online order with the consumer device as the consumer is waiting for the table. The consumer may use online menu display 900 shown in FIG. 9 to provide the online order. Additionally and/or alternatively, the consumer may place the online order prior to sending the request to be added to the waitlist at 2406 (e.g., via the consumer device, either at the restaurant or remote from the restaurant). In some embodiments, the online order (and/or online order data associated with the online order) may be further associated with the entry to the waitlist for the table added at 2406.

If the online order is received at 2410, method 2400 may proceed to 2412. At 2412, a trigger condition to begin preparing the online order may be determined. A technique similar to the discussion above regarding method 1200 (e.g., at 1206) may be used. As such, the determination may use one or more factors including time-based factors, event-based factors, and/or one or more condition-based factors, as discussed above. Alternatively and/or additionally, the trigger condition may be based on the estimated seating time. In some embodiments, the trigger condition may be set so that preparation of the online order may begin when the table is nearly ready. In that sense, the trigger condition may be further based on how long each menu item in the online order takes to prepare. At 2414, preparation of the online order may begin (e.g., upon satisfaction of the trigger condition). The discussion above regarding method 1200 (e.g., steps 1220 and/or 1224) may be applicable at 2414, in accordance with some embodiments.

Returning to 2410, if the online order is not received, method 2400 may proceed to 2416. At 2416, a determination may be made as to whether the table has become available. For example, the one or more servers may access the waitlist indicating table wait times as discussed at 2404. If the table is not available, method 2400 may return to 2408, where the estimated seating time is sent to the consumer device.

If the table is available, method 2400 may proceed to 2418, where an indication that the table (or any other suitable table) is available may be sent to the consumer device. In some embodiments, the one or more servers may poll or otherwise receive waitlist data updates from the order database 1812 and/or 1906. As such, the indication that the table is available may be efficiently provided to the consumer device such that the table may be seated without needless delay. Method 2400 may then end at 2420.

FIG. 17 shows system 1700 including an example network architecture, which may include one or more devices and sub-systems that are configured to implement some embodiments discussed herein. For example, system 1700 may include promotional system 1702, which can include, for example, promotional server 1704 and promotional database 1706, among other things (not shown). Promotional server 1702 may be any suitable network server and/or other type of processing device. Promotional database 1706 may be any suitable network database configured to store merchant and consumer data, deal offering data, deal voucher data, transaction data and/or redemption data, such as may be used to facilitate payment with a deal voucher or promotional account as discussed herein. In this regard, system 1702 may include, for example, at least one backend data server, network database, cloud computing device, among other things.

Promotional system 1702 can be coupled to one or more merchant systems 1710A-1710N via network 1708. In this regard, network 1708 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 1708 may include a cellular telephone, an 802.11, 802.16, 802.20, and/or WiMax network. Further, the network 1708 may include a public network, such as the Internet, a private network, such as an intranet, or combinations thereof, and may utilize a variety of networking protocols now available or later developed including, but not limited to TCP/IP based networking protocols.

Merchant systems 1710A-1710N may each be associated with a merchant, such as a restaurant. The depiction in FIG. 17 of "N" merchants is merely for illustration purposes. FIG. 18 shows an example merchant system 1800 that may include menu database 1802, ordering system 1804, POS system 1806, and kitchen system 1808. As used herein, any device of merchant system 1800 may be referred to as a "merchant device." Menu database 1802 may be configured to store menu items and/or menu information. In some embodiments, data stored in menu database 1802 may be used to generate an online menu (e.g., online menu display 900 shown in FIG. 9) and/or a POS menu (e.g., POS menu 402 shown in FIG. 4 and/or quick serve menu 602 shown in FIG. 6). Furthermore, menu database 1802 may updated or otherwise managed via the merchant device.

Ordering system 1804 may include order server 1810 and order database 1812. In some embodiments, order server 18010 may be configured to provide an online menu (e.g., online menu 900) to a consumer device (e.g., consumer device 1714 shown in FIG. 17). As discussed above, the online menu may be based on data stored in menu database 1802. Order server 1810 may further be configured to receive online orders from the consumer device, process the online order as discussed herein, and communicate the online orders to POS system 1806. In some embodiments, online orders and associated data (e.g., reservation times, number of guests, etc.) may be stored in order database 1812 for later retrieval.

POS system 1806 may include one or more POS devices 1806A-1806N. Each POS device 1806A-1806N may include a personal computer and/or other networked device, such as a cellular phone, tablet computer, mobile device, etc., that may be used for any suitable purpose in addition to providing point-of-sale functionality at the restaurant.

Accordingly, the displays 100-700 may be provided to a merchant by a POS device. As discussed above, the POS menu may be based on data stored in menu database 1802.

Kitchen system 1808 may include a computing device (not shown), one or more ticket printers 1814 and one or more display devices 1816. Kitchen system 1808 may be connected with the POS system such that order data, whether entered online or by the merchant via a POS device, may be sent to kitchen system 1808. In some embodiments, the computing device may process menu items and send each menu item to an appropriate ticket printer 1814 and/or display device 1816 to direct the kitchen staff, as discussed above with respect to method 1200. In some embodiments, POS system 1806 may be configured to directly send menu items to an appropriate ticket printer or display device.

System 1700 may further include one or more 3rd party systems 1714A-1714N, among other things. In some embodiments, different 3rd party system 1714A-1714N may be associated with different types of payment accounts. As discussed above with reference to FIGS. 13-15, an order may be associated with a plurality of payment accounts. Thus for each provided payment account, data may be sent to an appropriate third party system (e.g., a credit card transaction server, etc.).

In some embodiments, the ordering system and/or menu database may be separate from merchant systems 1710A-1710N. FIG. 19 shows a promotional system 1900 configured to include the menu database (e.g., menu database 1902) and/or the ordering system (e.g., ordering system 1904), in addition to promotional server 1910 and promotional database 1912. Promotional system 1900 may be configured to provide the online ordering functionality (e.g., the displays of FIGS. 9 and 15) to consumer devices, and/or provide POS functionality to merchant devices (e.g., the displays of FIGS. 1-7) via order server 1908. Order server 1908 may be configured to provide menu information by accessing menu database 1902. In some embodiments, promotional system 1900 may further include menu server 1914 configured to provide menu management functionality (e.g., menu manager display 700) to the merchant devices.

In some embodiments, the promotional system 1900 may be a multi-tenant database system configured to provide integrated POS, menu management and/or online ordering capability for a plurality of merchant systems 1710A-1710N. Additionally and/or alternatively, promotional system 1900 may be configured to provide online menus to consumer device 1712 to provide online ordering, reservation and/or payment functionality.

It is appreciated that the menu database, menu server, and/or ordering system may be maintained by one or more of a promotional system (e.g. promotional system 1900 shown in FIG. 9), a payment processing system, a scheduling system, and/or any other type of cloud-based system. As such, the functionality described herein (e.g., methods 800, 1000-1400, 1600 and 2400) may be provided to merchant devices and/or consumer devices as online services from one or more servers.

FIG. 20 shows a schematic block diagram of circuitry 2000, some or all of which may be included in, for example, promotional system 1702 or 1900, consumer device 1712, and/or merchant systems 1710A-2410N. As illustrated in FIG. 20, in accordance with some example embodiments, circuitry 2000 may include various means, such as one or more processors 2002, memories 2004, communications modules 2006, and/or input/output modules 2008.

In some embodiments, such as when circuitry 2000 is included in merchant systems 1710A-2410N and/or promotional system 1702 or 1900, payment/redemption module 1710 may also or instead be included. As referred to herein, "module" includes hardware, software and/or firmware configured to perform one or more particular functions. In this regard, the means of circuitry 2000 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 2004) that is executable by a suitably configured processing device (e.g., processor 2002), or some combination thereof.

Processor 2002 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 20 as a single processor, in some embodiments, processor 2002 comprises a plurality of processors. The plurality of processors may be embodied on a single computing device or may be distributed across a plurality of computing devices collectively configured to function as circuitry 2000. The plurality of processors may be in operative communication with each other and may be collectively configured to perform one or more functionalities of circuitry 2000 as described herein. In an example embodiment, processor 2002 is configured to execute instructions stored in memory 2004 or otherwise accessible to processor 2002. These instructions, when executed by processor 2002, may cause circuitry 2000 to perform one or more of the functionalities of circuitry 2000 as described herein.

Whether configured by hardware, firmware/software methods, or by a combination thereof, processor 2002 may comprise an entity capable of performing operations according to embodiments of the present invention while configured accordingly. Thus, for example, when processor 2002 is embodied as an ASIC, FPGA or the like, processor 2002 may comprise specifically configured hardware for conducting one or more operations described herein. As another example, when processor 2002 is embodied as an executor of instructions, such as may be stored in memory 2004, the instructions may specifically configure processor 2002 to perform one or more algorithms and operations described herein, such as those discussed in connection with FIGS. 8, 10-14 and 16.

Memory 2004 may comprise, for example, volatile memory, non-volatile memory, or some combination thereof. Although illustrated in FIG. 20 as a single memory, memory 2004 may comprise a plurality of memory components. The plurality of memory components may be embodied on a single computing device or distributed across a plurality of computing devices. In various embodiments, memory 2004 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2004 may be configured to store information, data (including deal parameter data and/or analytics data), applications, instructions, or the like for enabling circuitry 2000 to carry out various functions in accordance with example embodiments of the present invention. For example, in at least some embodiments, memory 2004 is configured to buffer input data for processing by processor 2002. Additionally or alternatively, in at least some embodiments, memory 2004 is configured to store program instructions for execution by processor 2002. Memory 2004 may store information in the form of static and/or dynamic information. This stored information may be stored and/or used by circuitry 2000 during the course of performing its functionalities.

Communications module 2006 may be embodied as any device or means embodied in circuitry, hardware, a computer program product comprising computer readable program instructions stored on a computer readable medium (e.g., memory 2004) and executed by a processing device (e.g., processor 2002), or a combination thereof that is configured to receive and/or transmit data from/to another device, such as, for example, a second circuitry 2000 and/or the like. In some embodiments, communications module 2006 (like other components discussed herein) can be at least partially embodied as or otherwise controlled by processor 2002. In this regard, communications module 2006 may be in communication with processor 2002, such as via a bus. Communications module 2006 may include, for example, an antenna, a transmitter, a receiver, a transceiver, network interface card and/or supporting hardware and/or firmware/software for enabling communications with another computing device. Communications module 2006 may be configured to receive and/or transmit any data that may be stored by memory 2004 using any protocol that may be used for communications between computing devices. Communications module 2006 may additionally or alternatively be in communication with the memory 2004, input/output module 2008 and/or any other component of circuitry 2000, such as via a bus.

Input/output module 2008 may be in communication with processor 2002 to receive an indication of a user input and/or to provide an audible, visual, mechanical, or other output to a user (e.g., merchant and/or consumer). Some example visual outputs that may be provided to a user by circuitry 2000 are discussed in connection with FIGS. 1-7, 9 and 15. As such, input/output module 2008 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 2000 is embodied as a server or database, aspects of input/output module 2008 may be reduced as compared to embodiments where circuitry 2000 is implemented as an end-user machine (e.g., consumer device and/or merchant device) or other type of device designed for complex user interactions. In some embodiments (like other components discussed herein), input/output module 2008 may even be eliminated from circuitry 2000. Alternatively, such as in embodiments wherein circuitry 2000 is embodied as a server or database, at least some aspects of input/output module 2008 may be embodied on an apparatus used by a user that is in communication with circuitry 2000, such as for example, POS devices 1806A-1806N and/or consumer device 1712. Input/output module 2008 may be in communication with the memory 2004, communications module 2006, and/or any other component(s), such as via a bus. Although more than one input/output module and/or other component can be included in circuitry 2000, only one is shown in FIG. 20 to avoid overcomplicating the drawing (like the other components discussed herein).

Payment/redemption module 2010 may also or instead be included and configured to perform the functionality discussed herein related to facilitating payment transactions and redemption of deal vouchers discussed above. In some embodiments, some or all of the functionality facilitating payment transactions and redemption of deal vouchers may be performed by processor 2002. In this regard, the example processes and algorithms discussed herein can be performed by at least one processor 2002 and/or payment/redemption module 2010. For example, non-transitory computer readable storage media can be configured to store firmware, one or more application programs, and/or other software, which include instructions and other computer-readable program code portions that can be executed to control each processor (e.g., processor 2002 and/or payment/redemption module 2010) of the components of system 1700 to implement various operations, including the examples shown above. As such, a series of computer-readable program code portions are embodied in one or more computer program products and can be used, with a computing device, server, and/or other programmable apparatus, to produce machine-implemented processes.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 1700. In some embodiments, one or more external systems (such as a remote cloud computing and/or data storage system) may also be leveraged to provide at least some of the functionality discussed herein.

FIGS. 21 and 22 provide some examples of data that may be stored in one or databases (e.g., promotional database 1704 and/or databases within 3rd party systems 1714A-1714N shown in FIG. 17) to facilitate payment transactions and redemption of deal vouchers in accordance with some example embodiments discussed herein. It should be noted the data fields illustrated are exemplary and that the embodiments of the invention are not limited to the fields illustrated in FIGS. 21 and 22, and that the embodiments of the invention may contain more or fewer fields than those illustrated.

FIG. 23 provides some examples of data that may be stored in one or more menu databases, such as menu database 1802, to provide data that may be used to generate online menus and POS menus. It is appreciated that the data fields illustrated are exemplary and that the embodiments of the invention are not limited to the fields illustrated in FIG. 23, and that the embodiments of the invention may contain more or fewer fields than those illustrated.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 2502 and/or deal payment/redemption module 2510 discussed above with reference to FIG. 25, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 2504) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Thus it is appreciated that the techniques for providing online ordering may be integrated with a scheduler/online reservation system that may be used by any type of merchant having any type of "brick-and-mortar" shop (that is, in addition to, or instead of, restaurant merchants). For example, the menu items discussed herein may be applicable to other types of goods or services. A salon may update a database including beauty products that may be purchased online via a consumer device or at a merchant device (e.g., at the salon). The consumer device may further schedule an appointment (e.g., make a reservation) in which the beauty products that are purchased online are used during the appointment. In another example, a retailer may provide products for online ordering and allow consumers devices to schedule an appointment to learn how to use products purchased online (e.g., a cellular phone or computing device for technology retailers) at the store.

Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for managing an online menu configured for ordering menu items from a restaurant comprising:
accessing a menu database comprising a plurality of menu items, one or more of the menu items associated with a respective menu item quantity;
generating, by a networked processor, menu information based on the menu items;
generating an online menu including a first set of menu items using the menu information;
causing display of a consumer view of the online menu to a display of a consumer device;
receiving, from the consumer device, online order data associated with an online order indicating at least one item from the first set of menu items;
updating the menu item quantity associated with the at least one item in the menu database;
determining that the updated menu item quantity fails to satisfy a defined menu inclusion threshold; and
updating the online menu to remove the at least one item from the first set of menu items.

2. The method of claim 1, further comprising:
transmitting point-of-sale data indicating the at least one item of the online order to a restaurant device associated with the restaurant; and
determining a trigger condition to begin preparation of the online order.

3. The method of claim 2, further comprising:
receiving an indication of a dine-in selection for the online order,
wherein the trigger condition is based on one or more of a location of the consumer device, a reservation time for the dine-in selection, a preparation time of the online order, or a size of the online order.

4. The method of claim 2, further comprising:
prior to receiving the online order data, associating a payment account with a consumer associated with the consumer device; and
subsequent to an occurrence of the trigger condition, facilitating a financial transaction using the payment account.

5. The method of claim 4, further comprising:
receiving an additional order of an additional item subsequent to receiving the online order data; and
associating the additional item with the payment account before facilitating the financial transaction.

6. The method of claim 5, wherein receiving the additional order of the additional item is received online.

7. The method of claim 5, wherein receiving the additional order of the additional item is received from a device in the restaurant.

8. The method of claim 4, further comprising associating an unpaid amount with the payment account.

9. The method of claim 2, further comprising:
receiving an indication to cancel the online order; and
responsive to receiving the indication to cancel the online order, canceling preparation of the online order.

10. The method of claim 1, further comprising:
accessing a waitlist indicating table wait times;
adding an entry to the waitlist for a table based on a request received from the consumer device;
sending an estimated seating time for the table to the consumer device;
associating the online order data with the entry to the waitlist; and
sending an indication that the table is available to the consumer device.

11. The method of claim 1, further comprising:
associating the online order with a plurality of payment accounts;
receiving payment data indicating how to allocate payment amounts among the plurality of payment accounts; and
facilitating financial transactions using the plurality of payment accounts according to the payment data.

12. The method of claim 11, wherein the payment data indicates a ratio for allocating the payment amounts among the plurality of payment accounts.

13. A system for managing an online menu configured for ordering menu items from a restaurant, comprising:
circuitry configured to:
access a menu database comprising a plurality of menu items, one or more of the menu items associated with a respective menu item quantity;
generate menu information based on the menu items;
generate an online menu including a first set of menu items using the menu information;
cause display of a consumer view of the online menu to a display of a consumer device;
receive, from the consumer device, online order data associated with an online order indicating at least one item from the first set of menu items;
update the menu item quantity associated with the at least one item in the menu database;
determine that the updated menu item quantity fails to satisfy a defined menu inclusion threshold; and
update the online menu to remove the at least one item from the first set of menu items.

14. The system of claim 13, wherein the circuitry is further configured to:
transmit point-of-sale data indicating the least one item of the online order to a restaurant device associated with the restaurant; and
determine a trigger condition to begin preparation of the online order.

15. The system of claim 14, wherein the circuitry is further configured to receive an indication of a dine-in selection for the online order and the trigger condition is based on one or more of a location of the consumer device, a reservation time, a preparation time of the online order, and a size of the online order.

16. The system of claim 14, wherein the circuitry is further configured to:
prior to receiving the online order data, associate a payment account with a consumer associated with the consumer device; and
subsequent to an occurrence of the trigger condition, facilitate a financial transaction using the payment account.

17. The system of claim 16, wherein the circuitry is further configured to:
receive an additional order of an additional item subsequent to receiving the online order data; and
associate the additional item with the payment account before facilitating the financial transaction.

18. The system of claim 17, wherein the additional order of the additional item is ordered online.

19. The system of claim 17, wherein the additional order of the additional item is ordered at the restaurant.

20. The system of claim 16, wherein the circuitry is further configured to associate an unpaid amount with the payment account.

* * * * *